(12) United States Patent
Bastian, II et al.

(10) Patent No.: US 10,377,527 B2
(45) Date of Patent: Aug. 13, 2019

(54) COMPOSITE CONCRETE PALLET

(71) Applicant: Bastian Solutions, LLC, Indianapolis, IN (US)

(72) Inventors: William A. Bastian, II, Carmel, IN (US); Garrett Clark, Carmel, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 0 days.

(21) Appl. No.: 14/745,914

(22) Filed: Jun. 22, 2015

(65) Prior Publication Data
US 2016/0368659 A1 Dec. 22, 2016

(51) Int. Cl.
*B65D 19/00* (2006.01)
*B29C 48/15* (2019.01)
(Continued)

(52) U.S. Cl.
CPC .......... *B65D 19/0012* (2013.01); *B29C 39/18* (2013.01); *B29C 48/15* (2019.02);
(Continued)

(58) Field of Classification Search
CPC ...... B65D 19/0012; B65D 2519/00039; B65D 2519/00044; B65D 2519/00074;
(Continued)

(56) References Cited

U.S. PATENT DOCUMENTS 3,159,115 A * 12/1964 Nolan ................ B65D 19/0038
108/57.27
3,581,681 A * 6/1971 Newton ............ B65D 19/0018
108/57.28
(Continued)

FOREIGN PATENT DOCUMENTS

CN 1565934 A 1/2005
CN 1646311 A 7/2005
(Continued)

OTHER PUBLICATIONS

International Patent Application PCT/US2016/031178 Search Report dated Sep. 5, 2016. 4 pages.
(Continued)

*Primary Examiner* — Janet M Wilkens
*Assistant Examiner* — Timothy M Ayres
(74) *Attorney, Agent, or Firm* — Woodard, Emhardt, Henry, Reeves & Wagner, LLP

(57) ABSTRACT

A composite pallet is made of concrete. The concrete material can include various concrete mixtures, such as Fiber Reinforced Concrete (FRC) or an Engineered Cementitious Composite (ECC). It also can include microspheres. The concrete material can be cast in a mold or formed via an extrusion process and then cured. The pallet components can include a core material that can form various voids or cavities. The core material can include polystyrene foam, and the foam forms a honeycomb, which is then filled with the concrete material. The concrete material can also be dyed to create different colors to identify the pallets. The pallets can further include plastic and/or rubber bumpers on the corners and/or edges to prevent or minimize chipping. The resulting pallet can be cured using carbon dioxide ($CO_2$) curing which reduces the cure time to about an hour or less.

49 Claims, 16 Drawing Sheets

(51) Int. Cl.
*B29C 39/18* (2006.01)
*B29L 31/00* (2006.01)

(52) U.S. Cl.
CPC .. *B65D 19/0014* (2013.01); *B29L 2031/7178* (2013.01); *B65D 2519/00039* (2013.01); *B65D 2519/00044* (2013.01); *B65D 2519/00074* (2013.01); *B65D 2519/00079* (2013.01); *B65D 2519/00144* (2013.01); *B65D 2519/00149* (2013.01); *B65D 2519/00268* (2013.01); *B65D 2519/00273* (2013.01); *B65D 2519/00288* (2013.01); *B65D 2519/00318* (2013.01); *B65D 2519/00363* (2013.01); *B65D 2519/00467* (2013.01); *B65D 2519/00472* (2013.01); *B65D 2519/00477* (2013.01); *B65D 2519/00562* (2013.01); *B65D 2519/00786* (2013.01); *B65D 2519/00791* (2013.01); *Y02A 30/336* (2018.01)

(58) Field of Classification Search
CPC ........... B65D 2519/00079; B65D 2519/00144; B65D 2519/00149; B65D 2519/00268; B65D 2519/00786; B29C 47/02; B29L 2031/7178
USPC ....................................................... 108/57.33
See application file for complete search history.

(56) References Cited

U.S. PATENT DOCUMENTS

| | | | |
|---|---|---|---|
| 3,619,457 A * | 11/1971 | Chandler | B28B 19/0046 264/246 |
| 3,966,529 A | 6/1976 | Kuroda | |
| 4,226,203 A | 10/1980 | Marcin | |
| 4,280,974 A | 7/1981 | Piazza | |
| 4,393,999 A | 7/1983 | Forshee | |
| 4,504,320 A | 3/1985 | Rizer et al. | |
| 4,621,468 A * | 11/1986 | Likozar | E04F 15/02429 52/126.6 |
| 5,095,674 A | 3/1992 | Huettemann | |
| 5,229,051 A * | 7/1993 | Martin | B28B 7/266 264/261 |
| 5,388,533 A | 2/1995 | Pigott et al. | |
| 5,413,052 A * | 5/1995 | Breezer | B65D 19/0012 108/56.1 |
| 5,425,521 A * | 6/1995 | Locke | B65D 11/16 108/57.17 |
| 5,675,956 A * | 10/1997 | Nevin | E04C 3/34 264/262 |
| 5,833,394 A * | 11/1998 | McCavour | E01F 5/005 405/126 |
| 6,083,318 A | 7/2000 | Zawada et al. | |
| 6,352,039 B1 | 3/2002 | Woods et al. | |
| 6,739,797 B1 * | 5/2004 | Schneider | B28B 7/0029 404/35 |
| 6,745,703 B2 * | 6/2004 | Torrey | B65D 19/0012 108/51.11 |
| 6,758,148 B2 * | 7/2004 | Torrey | B65D 19/0004 108/51.11 |
| 6,969,423 B2 | 11/2005 | Li et al. | |
| 6,972,144 B2 * | 12/2005 | Roth | B29C 44/326 428/114 |
| 6,976,345 B2 | 12/2005 | Keshmiri | |
| 7,347,148 B2 | 3/2008 | Roth et al. | |
| 7,906,979 B2 | 3/2011 | Yoshida et al. | |
| 8,104,242 B1 * | 1/2012 | Fouad | E04C 3/34 52/223.14 |
| 8,146,516 B2 * | 4/2012 | Linares | B32B 3/12 108/51.3 |
| 8,397,649 B2 * | 3/2013 | Smith | B29C 70/865 108/57.25 |
| 8,438,981 B2 * | 5/2013 | Linares | B65D 19/0012 108/57.22 |
| 8,813,660 B2 * | 8/2014 | Linares | B65D 19/0095 108/57.25 |
| 9,102,086 B2 * | 8/2015 | Roberts | B29C 44/206 |
| 9,138,945 B2 | 9/2015 | Rimmer et al. | |
| 9,272,484 B2 * | 3/2016 | Roberts, Jr. | B29C 44/1233 |
| 2002/0162295 A1 | 11/2002 | Keshmiri | |
| 2005/0155528 A1 | 7/2005 | Moore, Jr. et al. | |
| 2006/0147681 A1 | 7/2006 | Dubey | |
| 2006/0288914 A1 * | 12/2006 | Lee | B65D 19/0038 108/51.11 |
| 2008/0072796 A1 | 3/2008 | Utagaki et al. | |
| 2008/0110377 A1 | 5/2008 | Stevens | |
| 2008/0157428 A1 | 7/2008 | Utagaki et al. | |
| 2008/0178771 A1 | 7/2008 | Utagaki et al. | |
| 2010/0116180 A1 | 5/2010 | Roth et al. | |
| 2010/0218705 A1 | 9/2010 | Mani | |
| 2011/0120353 A1 | 5/2011 | Jensen et al. | |
| 2012/0266785 A1 | 10/2012 | Apps | |
| 2013/0032507 A1 | 2/2013 | Du Toit et al. | |
| 2014/0137727 A1 | 5/2014 | Riley | |
| 2015/0218049 A1 | 8/2015 | Anderson et al. | |
| 2015/0251952 A1 * | 9/2015 | Byrd | C04B 28/04 106/672 |
| 2016/0368659 A1 | 12/2016 | Bastian, II et al. | |

FOREIGN PATENT DOCUMENTS

| | | |
|---|---|---|
| CN | 1752377 A | 3/2006 |
| CN | 101342958 A | 1/2009 |
| CN | 103693270 A | 4/2014 |
| EP | 0 583 796 A1 | 2/1994 |
| JP | 2009-166882 A | 7/2009 |
| KR | 10-1249281 B1 | 4/2013 |
| WO | WO 1994/010052 A2 | 5/1994 |

OTHER PUBLICATIONS

International Patent Application PCT/US2016/031178 Written Opinion dated Sep. 5, 2016. 13 pages.
International Patent Application PCT/US2016/031178 International Preliminary Report on Patentability dated Jan. 4, 2018. 15 pages.
International Patent Application PCT/US2018/025498 International Search Report dated Jul. 12, 2018. 5 pages.
International Patent Application PCT/US2018/025498 Written Opinion dated Jul. 12, 2018. 13 pages.
European Patent Application 16814872.4 Extended Search Report dated Nov. 9, 2018.
China Patent Application No. 201680048632.2 Office Action dated Mar. 4, 2019. 22 pages.

* cited by examiner

COMPOSITE CONCRETE PALLET

BACKGROUND

Pallets are widely used throughout in industry because they make it easier to move heavy loads. Most pallets can easily carry a load of 1,000 kg (2,205 lb.) or even more. Typical pallets are designed to be hauled by forklift trucks of different sizes or even by hand-pumped and hand-drawn pallet jacks. For environmental and economic purposes, there has been a trend to recycle and, more significantly, reuse pallets. Traditional pallets are made from inexpensive wood. However, there are a number of significant drawbacks to wood pallets. While the wood in the pallet can be recycled, wood pallets have a tendency to break and splinter after repeated use. Nails at times pop from the pallet which can be hazardous. Wood pallets are undesirable for international shipments because they can harbor invasive insects and plant diseases. Although wood can be heat treated or chemically fumigated, wood pallets still might not be allowed in a number of situations. Even some countries and international agreements require most pallets shipped across national borders to be made of materials that are incapable of being a carrier of invasive species of insects and plant diseases, and they may still require heat treating and/or fumigation. Pallets made of non-wood materials such as steel, aluminum, and plastic have been developed, but they tend to be considerably more expensive than traditional wood pallets and have several other drawbacks. For example, metal pallets can be considerably heavier than woods pallets which in turn can increase shipping costs as well as create other handling issues. Plastic pallets can be flammable and are prone to damage.

Thus, there is a need for improvement in this field.

SUMMARY

A composite pallet made of concrete has been developed to address a number of issues. The concrete is durable so that the pallet can be reused, and the concrete pallet has been designed to be inexpensive so as to have a cost comparable to traditional wood pallets. In some (but not all) cases, the concrete pallet has been configured and/or formulated with concrete material to have a weight and strength comparable to traditional wood pallets. By being made of concrete, the pallet is able to be heated treated, fumigated, and/or otherwise exposed to various chemicals with little risk for damage. Unlike wood, concrete is typically inflammable which is especially helpful in reducing the risk of fire in large manufacturing and/or warehousing operations. The concrete material can include glass bubbles such as microspheres or bubbles made from recycled material. The concrete material can include various concrete mixtures, such as Fiber Reinforced Concrete (FRC) or an Engineered Cementitious Composite (ECC). The concrete material can be cast in a mold or formed via an extrusion process and then cured. When formed using the extrusion method, various components, such as planks of material, can be joined with the other components of the pallet via an adhesive so as to avoid the need for nails. In another example, a reinforcement structure, such as similar to rebar, can be used to hold a leg or block in place. A mesh or scrim can be used to reinforce the pallet. The components can include a core material that can form various voids, such as in a hexagonal pattern that can be filled with the concrete material to form a lattice. The core material can be used to reduce the weight of the pallet and/or dampen any impacts or vibrations. In one example, the core material includes polystyrene foam; the foam forms a honeycomb, which is then filled with the concrete material. The concrete material can also be dyed to create different colors to identify the pallets. The pallets can further include plastic and/or rubber bumpers on the corners and/or edges to prevent or minimize chipping. The resulting pallet can be cured using carbon dioxide ($CO_2$) curing which reduces the cure time to about an hour or less. Other curing techniques, such as steam curing and/or curing with an autoclave, can be used.

Aspect 1 concerns an article of manufacture, comprising a pallet; wherein at least part of the pallet includes concrete; and wherein the pallet has one or more cores with at least one property different from the concrete.

Aspect 2 concerns the article of aspect 1, wherein the concrete includes fiber reinforced concrete (FRC).

Aspect 3 concerns the article of aspect 1, wherein the concrete includes Engineered Cementitious Composite (ECC).

Aspect 4 concerns the article of aspect 1, further comprising microspheres disposed inside the concrete.

Aspect 5 concerns the article of aspect 1, wherein the pallet defines one or more cavities that are at least partially filled with the cores.

Aspect 6 concerns the article of aspect 1, wherein the cores are less dense than the concrete.

Aspect 7 concerns the article of aspect 1, wherein the cores are more resilient than the concrete.

Aspect 8 concerns the article of aspect 1, wherein the cores include polystyrene foam.

Aspect 9 concerns the article of aspect 1, wherein the cores define a lattice of the concrete.

Aspect 10 concerns the article of aspect 9, wherein the lattice has a honeycomb pattern.

Aspect 11 concerns the article of aspect 9, wherein the lattice includes at least two areas having different lattice patterns.

Aspect 12 concerns the article of aspect 11, wherein the at least two areas include a support area and a filler area.

Aspect 13 concerns the article of aspect 12, wherein the pallet includes a top deck having the support area and the filler area.

Aspect 14 concerns the article of aspect 13, further comprising a bottom deck defining one or more jack openings that correspond in location to the filler area in the top deck; and wherein the bottom deck includes a second lattice corresponding to the support area in the top deck.

Aspect 15 concerns the article of aspect 1, wherein the pallet includes a deck, and a spacer structure extending from the deck, wherein the spacer structure includes the concrete.

Aspect 16 concerns the article of aspect 15, wherein the spacer structure has the cores.

Aspect 17 concerns the article of aspect 15, wherein the spacer structure includes one or more blocks; and wherein the deck includes one or more collars in which the blocks are received.

Aspect 18 concerns the article of aspect 15, wherein the spacer structure includes one or more blocks; and wherein the deck includes one or more block recesses in which the blocks are received.

Aspect 19 concerns the article of aspect 15, wherein the deck includes one or more alignment openings; and the spacer structure includes one or more alignment protrusions received in the alignment openings.

Aspect 20 concerns the article of aspect 15, wherein the spacer structure includes one or more blocks that have a hexagonal shape.

Aspect 21 concerns the article of aspect 15, wherein the deck and the spacer structure form a unitary structure that includes a casing in which the concrete is disposed.

Aspect 22 concerns the article of aspect 1, wherein the pallet includes one or more hand openings.

Aspect 23 concerns the article of aspect 1, wherein the concrete is color dyed to identify the pallet.

Aspect 24 concerns the article of aspect 1, wherein the pallet includes one or more bumpers.

Aspect 25 concerns the article of aspect 1, the pallet includes a mesh embedded in the concrete to reinforce the concrete.

Aspect 26 concerns the article of aspect 25, wherein the cores are sandwiched between the mesh.

Aspect 27 concerns the article of aspect 25, wherein the mesh includes a scrim strip extending in a longitudinal direction inside the pallet.

Aspect 28 concerns the article of aspect 25, wherein the mesh includes an overlay scrim.

Aspect 29 concerns the article of aspect 25, wherein the mesh includes scrim strips extending in a cross pattern.

Aspect 30 concerns the article of aspect 1, wherein the pallet includes a reinforcement structure disposed inside the concrete.

Aspect 31 concerns the article of aspect 30, wherein the reinforcement structure includes rebar.

Aspect 32 concerns the article of aspect 1, wherein the pallet includes a top deck made of the concrete; a bottom deck made of the concrete; and a spacer structure disposed between the top deck and the bottom deck to define one or more fork openings, wherein the spacer structure is made of the concrete.

Aspect 33 concerns the article of aspect 32, wherein the top deck and the spacer structure form a unitary structure that includes a casing in which the concrete fills.

Aspect 34 concerns the article of aspect 32, wherein the top deck, the bottom deck, and the spacer structure contain the cores.

Aspect 35 concerns a method, comprising forming one or more components of a pallet with one or more cores inside concrete; wherein the cores have at least one property different from the concrete; and curing the concrete.

Aspect 36 concerns the method of aspect 35, wherein the cores are less dense than the concrete.

Aspect 37 concerns the method of aspect 35, wherein the cores include polystyrene foam.

Aspect 38 concerns the method of aspect 35, wherein said forming includes casting the components in one or more molds.

Aspect 39 concerns the method of aspect 35, wherein said forming includes embedding the cores in the concrete.

Aspect 40 concerns the method of aspect 35, wherein said forming includes creating one or more lattice patterns with the cores.

Aspect 41 concerns the method of aspect 35, wherein said forming includes extruding the components with one or more cavities.

Aspect 42 concerns the method of aspect 41, further comprising filling the cavities with one or more cores after said extruding.

Aspect 43 concerns the method of aspect 35, wherein said forming includes creating a top deck and spacer structure by filling a casing with the concrete.

Aspect 44 concerns the method of aspect 35, further comprising wherein the components created during said forming include a top deck, a bottom deck, and a spacer structure; and securing the spacer structure between the top deck and the bottom deck with an adhesive to define one or more fork openings.

Aspect 45 concerns the method of aspect 35, wherein said forming includes embedding a mesh in the concrete.

Aspect 46 concerns the method of aspect 45, wherein said embedding the mesh includes sandwiching at least one of the cores between the mesh.

Aspect 47 concerns the method of aspect 35, wherein said curing includes curing the concrete in carbon dioxide.

Aspect 48 concerns the method of aspect 35, wherein said curing includes curing the concrete in steam.

Aspect 49 concerns the method of aspect 35, wherein said curing includes curing the concrete with an autoclave.

Aspect 50 concerns the method of claim 35, further comprising embedding rebar in the concrete.

Aspect 51 concerns A method of manufacturing the article of any preceding aspects.

Aspect 52 concerns the article of any preceding aspect, wherein the concrete includes fiber reinforced concrete (FRC).

Aspect 53 concerns the article of any preceding aspect, wherein the concrete includes Engineered Cementitious Composite (ECC).

Aspect 54 concerns the article of any preceding aspect, further comprising microspheres disposed inside the concrete.

Aspect 55 concerns the article of any preceding aspect, wherein the pallet defines one or more cavities that are at least partially filled with the cores.

Aspect 56 concerns the article of any preceding aspect, wherein the cores are less dense than the concrete.

Aspect 57 concerns the article of any preceding aspect, wherein the cores are more resilient than the concrete.

Aspect 58 concerns the article of any preceding aspect, wherein the cores include polystyrene foam.

Aspect 59 concerns the article of any preceding aspect, wherein the cores define a lattice of the concrete.

Aspect 60 concerns the article of any preceding aspect, wherein the lattice has a honeycomb pattern.

Aspect 61 concerns the article of any preceding aspect, wherein the lattice includes at least two areas having different lattice patterns.

Aspect 62 concerns the article of any preceding aspect, wherein the at least two areas include a support area and a filler area.

Aspect 63 concerns the article of any preceding aspect, wherein the pallet includes a top deck having the support area and the filler area.

Aspect 64 concerns the article of any preceding aspect, further comprising a bottom deck defining one or more jack openings that correspond in location to the filler area in the top deck; and wherein the bottom deck includes a second lattice corresponding to the support area in the top deck.

Aspect 65 concerns the article of any preceding aspect, wherein the pallet includes a deck, and a spacer structure extending from the deck, wherein the spacer structure includes the concrete.

Aspect 66 concerns the article of any preceding aspect, wherein the spacer structure has the cores.

Aspect 67 concerns the article of any preceding aspect, wherein the spacer structure includes one or more blocks; and wherein the deck includes one or more collars in which the blocks are received.

Aspect 68 concerns the article of any preceding aspect, wherein the spacer structure includes one or more blocks;

and wherein the deck includes one or more block recesses in which the blocks are received.

Aspect 69 concerns the article of any preceding aspect, wherein the deck includes one or more alignment openings; and the spacer structure includes one or more alignment protrusions received in the alignment openings.

Aspect 70 concerns the article of any preceding aspect, wherein the spacer structure includes one or more blocks that have a hexagonal shape.

Aspect 71 concerns the article of any preceding aspect, wherein the deck and the spacer structure form a unitary structure that includes a casing in which the concrete is disposed.

Aspect 72 concerns the article of any preceding aspect, wherein the pallet includes one or more hand openings.

Aspect 73 concerns the article of any preceding aspect, wherein the concrete is color dyed to identify the pallet.

Aspect 74 concerns the article of any preceding aspect, wherein the pallet includes one or more bumpers.

Aspect 75 concerns the article of any preceding aspect, the pallet includes a mesh embedded in the concrete to reinforce the concrete.

Aspect 76 concerns the article of any preceding aspect, wherein the cores are sandwiched between the mesh.

Aspect 77 concerns the article of any preceding aspect, wherein the mesh includes a scrim strip extending in a longitudinal direction inside the pallet.

Aspect 78 concerns the article of any preceding aspect, wherein the mesh includes an overlay scrim.

Aspect 79 concerns the article of any preceding aspect, wherein the mesh includes scrim strips extending in a cross pattern.

Aspect 80 concerns the article of any preceding aspect, wherein the pallet includes a reinforcement structure disposed inside the concrete.

Aspect 81 concerns the article of any preceding aspect, wherein the reinforcement structure includes rebar.

Aspect 82 concerns the article of any preceding aspect, wherein the pallet includes a top deck made of the concrete; a bottom deck made of the concrete; and a spacer structure disposed between the top deck and the bottom deck to define one or more fork openings, wherein the spacer structure is made of the concrete.

Aspect 83 concerns the article of any preceding aspect, wherein the top deck and the spacer structure form a unitary structure that includes a casing in which the concrete fills.

Aspect 84 concerns the article of any preceding aspect, wherein the top deck, the bottom deck, and the spacer structure contain the cores.

Further forms, objects, features, aspects, benefits, advantages, and embodiments of the present invention will become apparent from a detailed description and drawings provided herewith.

DETAILED DESCRIPTION

Figure 1:
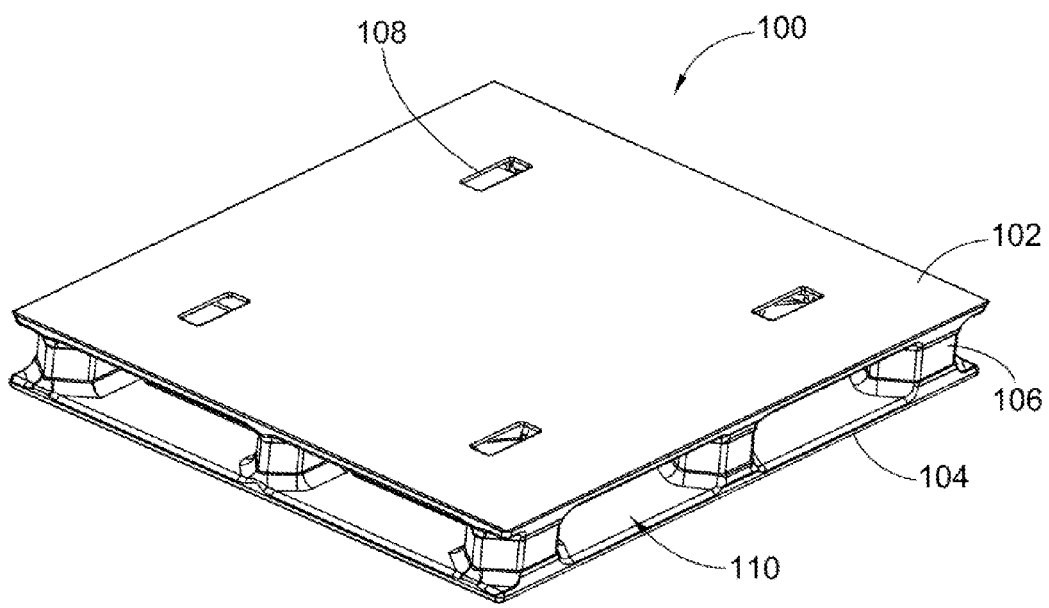
FIG. 1 is a perspective view of a pallet according to one embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 shows a perspective view of a pallet 100 according to one embodiment. The pallet 100 in one example is a composite pallet made of concrete. By being made of concrete, the pallet 100 can be made more durable as compared to traditional wooden pallets which have a tendency to splinter. Moreover, traditional wood and plastic pallets are able to burn which can create dangerous situations in warehouse environments. It should be recognized that the concrete pallet 100 will normally not burn. In addition, the concrete pallet 100 can be used in harsh environmental/chemical conditions and, unlike wooden pallets, does not need to be fumigated for undesirable wood boring insects or other invasive organisms. As will be explained further below, the pallet 100 has been designed to have the weight and cost comparable to traditional wooden pallets. In one form, the pallet 100 is made of fiber reinforced concrete so as to improve its tensile strength and durability, and in one particular form, the pallet 100 is made of engineered cementitious concrete (ECC) so as to further promote strength and durability. The concrete material can include bubbles such as glass microspheres, expanded glass, and/or glass bubbles made from recycled material so as to reduce the overall weight of the pallet. The concrete material forming the pallet 100 in some forms is also dyed to create different colors to readily identify different types or kinds of pallets. As will be explained below, the pallet 100 can further include bumpers on the corners and elsewhere to prevent or minimize chipping.

Figure 2:
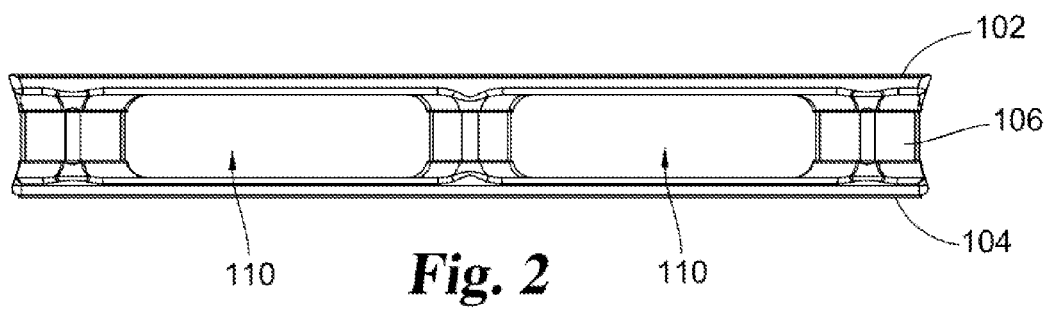
FIG. 2 is an end view of the FIG. 1 pallet.
Figure 3:
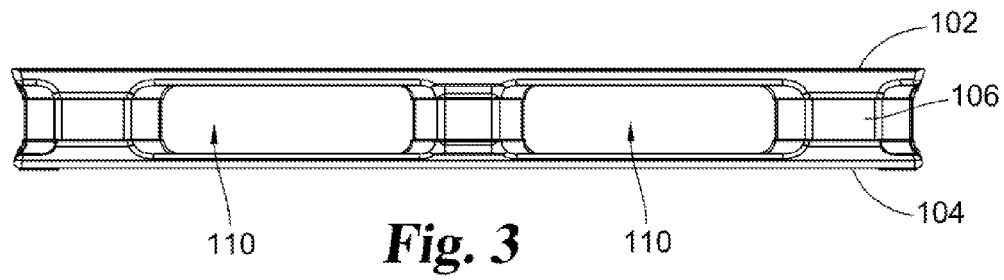
FIG. 3 is a side view of the FIG. 1 pallet.
Figure 4:
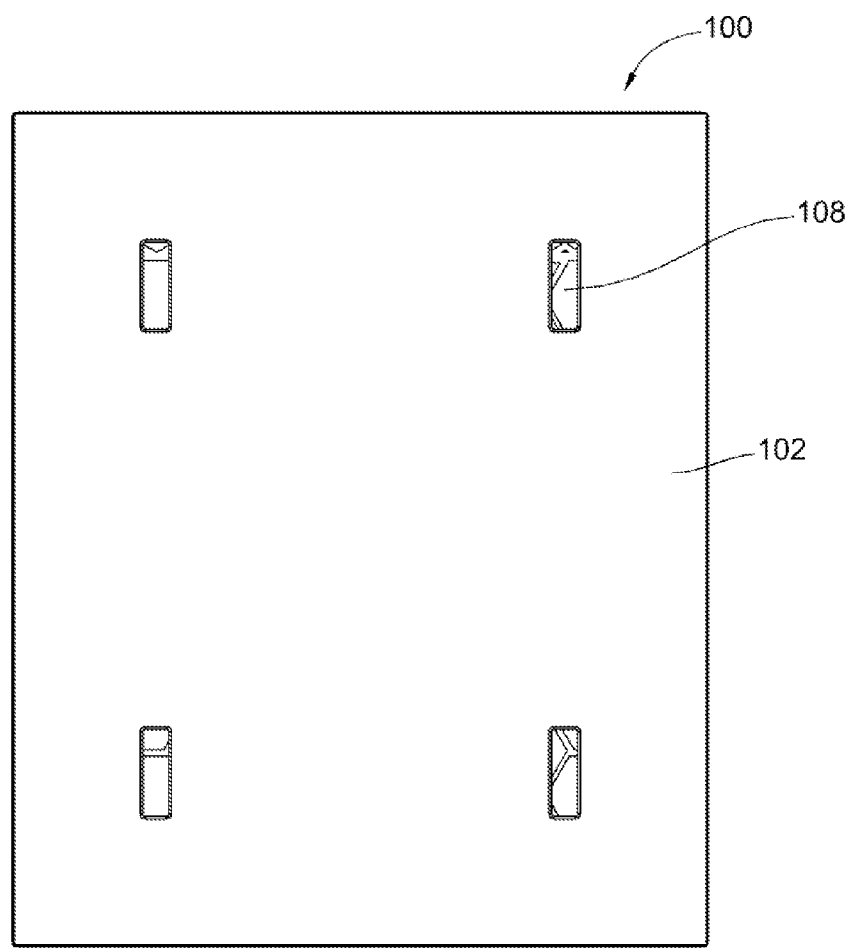
FIG. 4 is a top view of the FIG. 1 pallet.
Figure 5:
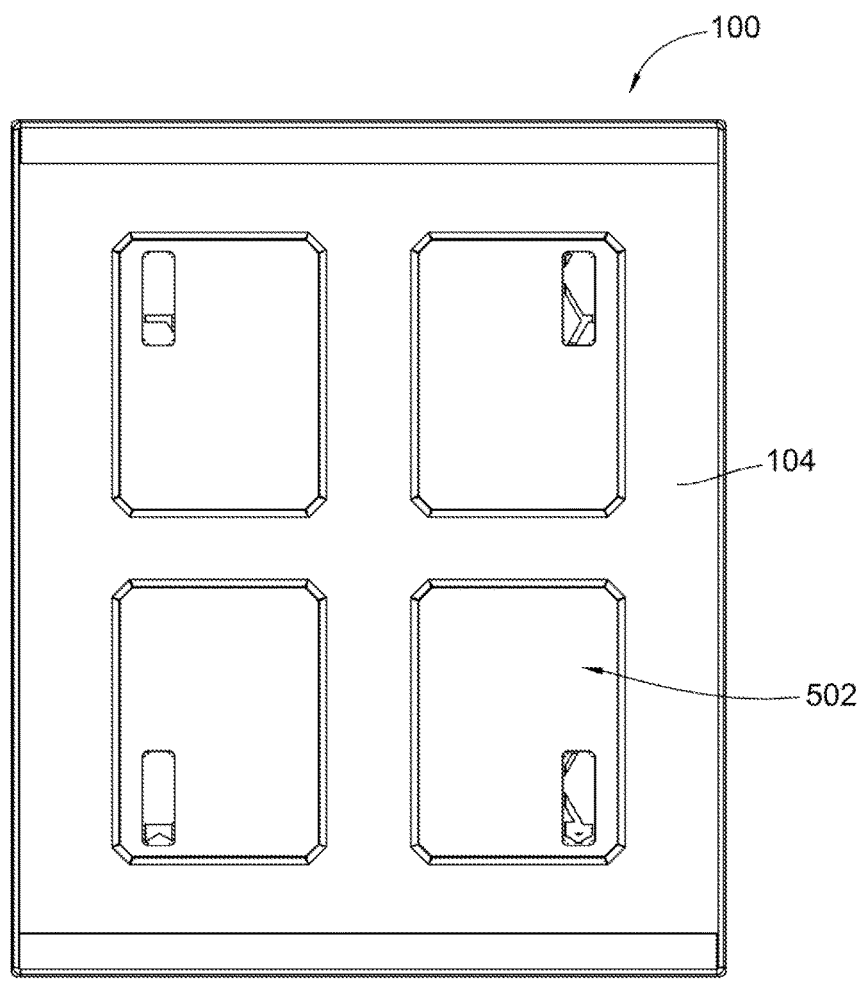
FIG. 5 is a bottom view of the FIG. 1 pallet.

FIGS. 2 and 3 respectively show end and side views of the pallet 100, and FIG. 4 shows a top view of the pallet 100. It should be noted that the ends and sides of the pallet 100 shown in FIGS. 2 and 3 are mirror images of one another such that they have the same configuration. As shown in FIGS. 1, 2, 3, and 4, the pallet 100 includes a top deck 102, a bottom deck 104, and a spacer structure 106 disposed between the top deck 102 and the bottom deck 104. The top deck 102 has one or more hand openings 108 that allow a person to manually move or otherwise manipulate the pallet 100. The spacer structure 106 defines one or more fork openings 110 that are configured to receive forks, such as from a forklift or hand jack. In the illustrated example, the fork openings 110 are tapered to facilitate guiding the forks into the fork openings 110, and as shown in FIGS. 2 and 3, the fork openings 110 are positioned on all sides around the pallet 100 so that a forklift can access and lift the pallet 100 from any side. As shown by the bottom view of the pallet 100 in FIG. 5, the bottom deck 104 defines one or more jack openings 502. Among other things, the jack openings 502 allow the wheels of a hand jack to bear against the floor or ground. These jack openings 502 can also help reduce the weight of the pallet 100 as well as promote ventilation of air and drainage of fluid from the pallet 100.

Figure 6:
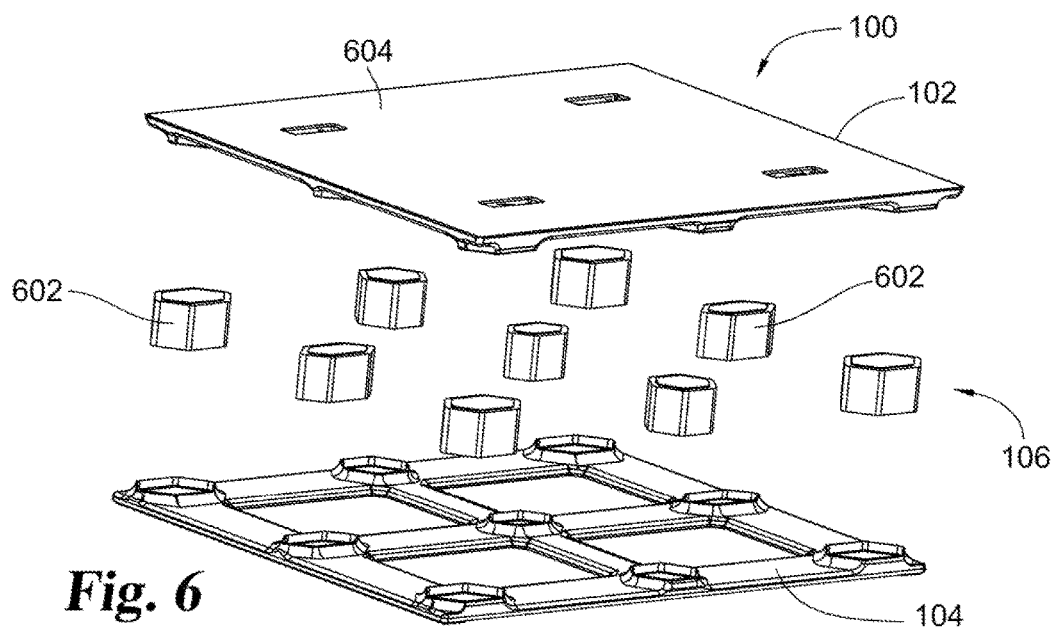
FIG. 6 is an exploded view of the FIG. 1 pallet.

In one form, the pallet 100 is molded at one time as a unitary structure. In other forms, one or more components of the pallet 100 are molded and/or extruded separately and then joined together. The components of the pallet 100 can be joined in a number of ways. For example, the components of the pallet 100, such as the top deck 102, bottom deck 104, and spacer structure 106, in one variation are joined together via an adhesive so as to avoid the need for nails which can pop and rust over time. FIG. 6 shows an exploded view of the pallet 100. As depicted, the spacer structure 106 includes one or more blocks or supports 602 that are sandwiched between the top deck 102 and the bottom deck 104. In the illustrated example, the blocks 602 are arranged in 3×3 array so as to promote even support of the top deck 102. The blocks 602 along with the top 102 and bottom 104 decks are formed via a molding technique. In another example, the top 102 and bottom 104 decks are molded, and the blocks 602 are extruded.

To make the manufacturing process more efficient and less expensive, the concrete of the pallet 100 and/or it components (once formed) are cured using a carbon dioxide ($CO_2$) curing process. It was discovered that curing the pallet 100 in a $CO_2$ environment significantly reduced curing time to about an hour or even less. This relatively short curing time helps to make the pallet 100 more commercially viable to produce because it shortens the manufacturing process and reduces inline inventory. In other examples, steam curing and/or an autoclave is used to cure the pallet 100.

Figure 7:
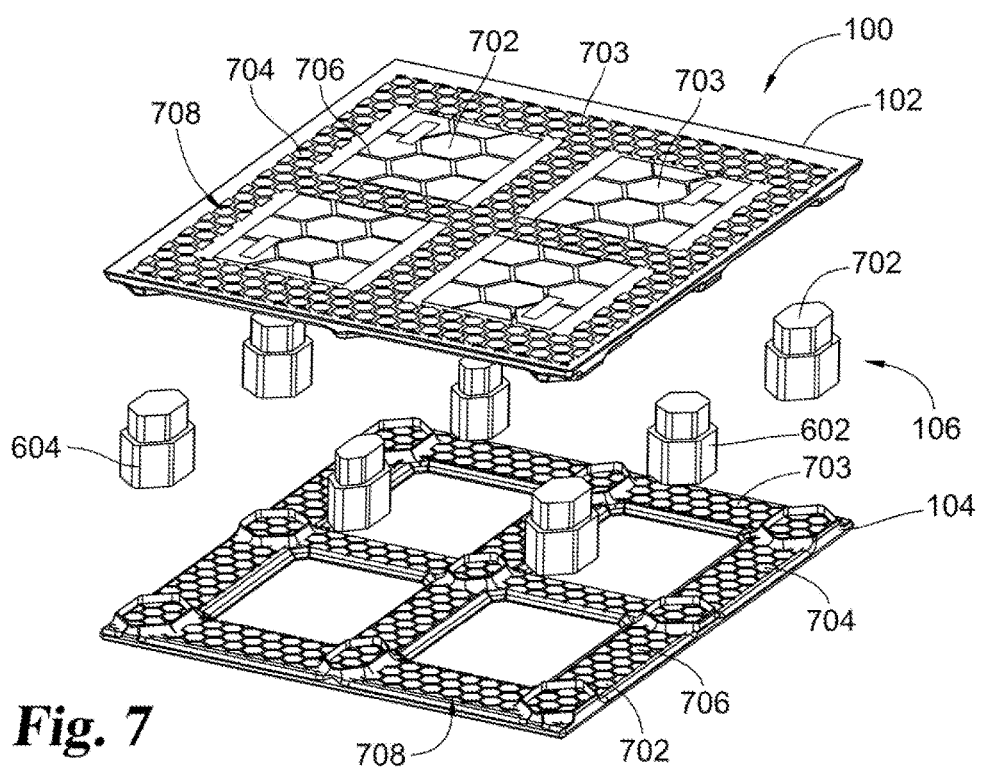
FIG. 7 is an exploded view of the FIG. 1 pallet with exposed core sections.

The pallet 100 shown in the drawings is a composite. In the illustrated example, the exterior or outer skin 604 of the pallet 100 and its components is made of concrete material, such as fiber reinforced concrete material, and more specifically, ECC. All or part of the interior of the pallet 100 and/or its components is made from one or more different materials so as to enhance the properties of the pallet 100, such as weight, durability, and cost. FIG. 7 shows an exploded view of the pallet 100 with cores 702 of the decks 102, 104 and blocks 602 exposed. Again, the cores 702 of these components are made of materials with different properties from the concrete forming the exterior or outer skin 604 of the components of the pallet 100. For example, the core 702 of the pallet 100 can be made from material that is lighter, less dense, and/or less expensive than the concrete. In one example, the material forming the core 702 includes polystyrene foam. Having the core 702 made of polystyrene foam reduces the overall weight of the pallet 100 so that the weight of the pallet 100 is comparable to a wooden pallet. As a result, the risk of injury is reduced, and by having comparable weight, the composite pallet 100 can be more readily adapted to existing equipment and processes. For instance, material handling equipment or vehicles, such as trucks, conveyors, storage racks, robots, and scales, do not need to be retrofitted to compensate for additional load because the pallet 100 generally weighs the same as traditional pallets, or even weighs less in some cases. The polystyrene foam also aids in the durability of the pallet 100. In particular, the polystyrene foam acts as a shock absorber by absorbing, dispersing, and/or dampening the energy from an impact. For the top 102 and bottom 104 decks, the core 702 has individual core pieces 703 that form a core pattern 704. This core pattern 704 creates gaps or cavities 706 between the individual core pieces 703 which the concrete material can fill. This in turn allows the concrete to form a lattice 708 inside the core 702 so as to further strengthen the pallet 100 once cured. Although the core 702 is covered or encased by the concrete in the illustrated example so as to provide protection, parts of the core 702 can be exposed in other examples so as to not be completely covered.

Figure 8:
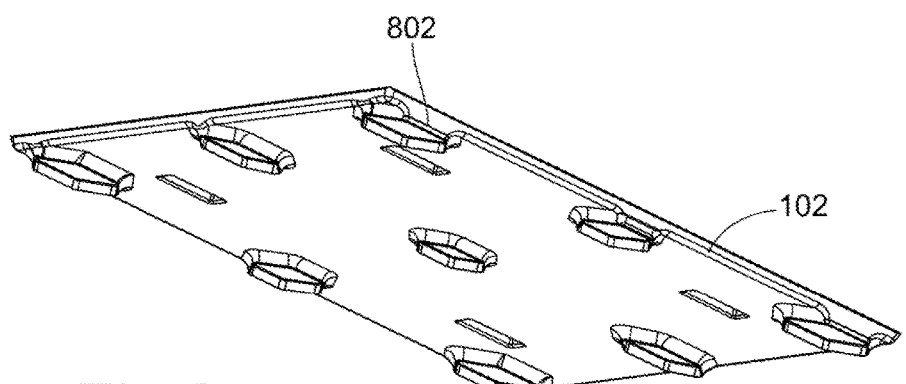
FIG. 8 is a bottom perspective view of a top deck of the FIG. 1 pallet.
Figure 9:
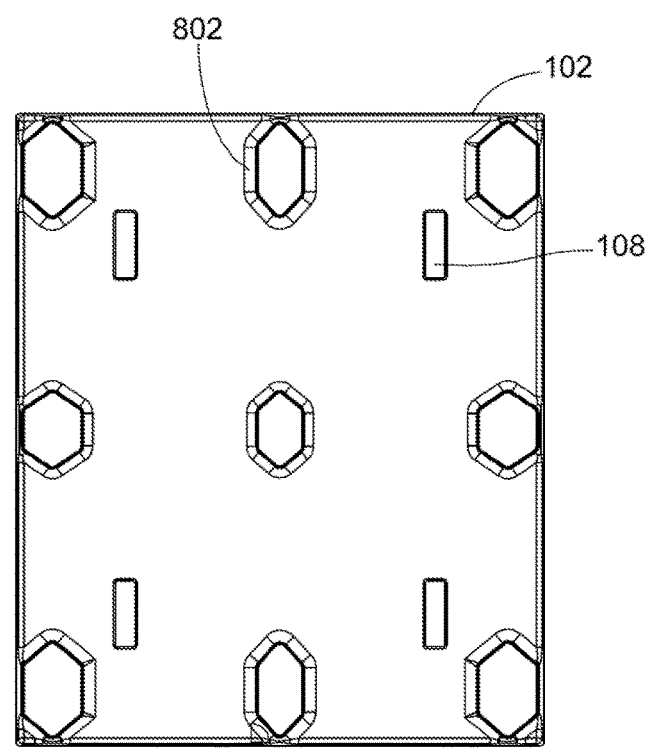
FIG. 9 is a bottom view of the FIG. 8 top deck.

FIGS. 8 and 9 respectively show perspective and bottom views of the top deck 102. As can be seen, the top deck 102 includes one or more collars 802 in which the blocks 602 are received. The collars 802 provide lateral bracings for the blocks 602 and are beveled so as to reduce the risk of chipping as well as help guide the forks into the fork openings 110. The collars 802 generally coincide with the shape of the individual blocks 602. In the illustrated example, the shape and size of the blocks 602 depend on their location within the pallet 100, and consequently, the size and shape of the collars 802 vary as well. In other examples, the blocks 602 and collars 802 can be uniform or shaped differently than is illustrated.

Figure 10:
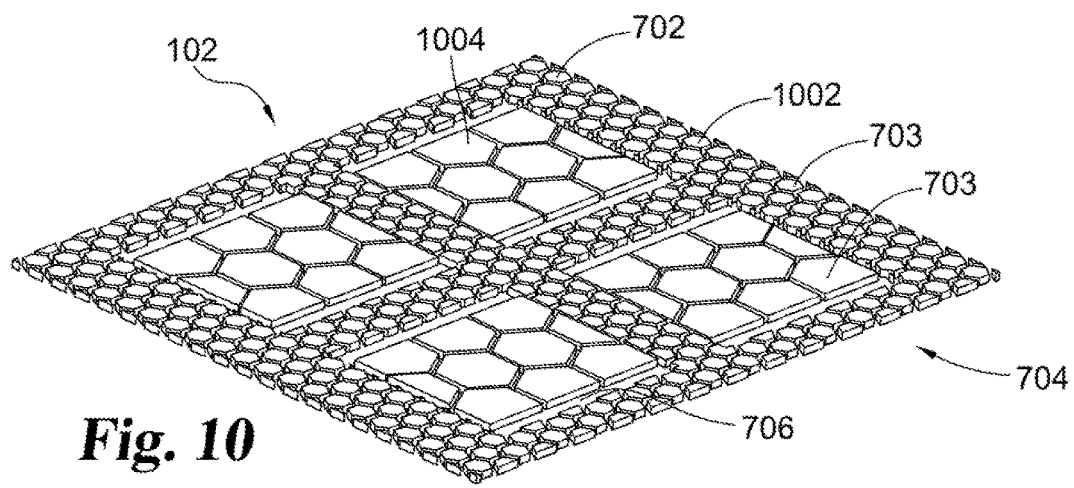
FIG. 10 is a perspective view of a core located inside the FIG. 8 top deck.

FIG. 10 shows a perspective view of the core pattern 704 for the core 702 of the top deck 102. The core pattern 704 in this example generally includes two area types, a support area 1002 and a filler area 1004. As should be appreciated, the support area 1002 has a shape similar to that of the bottom deck 104. The support area 1002 is designed to provide greater structural support as compared to the filler area 1004. On the other hand, the filler area 1004 generally corresponds to the jack openings 502 of the bottom deck 104 and is designed to reduce the weight of the pallet 100. In particular, the support area 1002 has a denser core pattern 704 as compared to the filler area 1004 so as to promote strength when the concrete fills the core pattern 704 to create the lattice 708. While both areas 1002, 1004 in FIG. 10 have a similar honeycomb pattern, the core pieces 703 in the filler area are larger so that less concrete is present in the fill area so as to lighten the pallet 100. In other examples, the core pieces 703 in both areas 1002, 1004 can have the same size but are spaced differently in different patterns or the core pattern 704 can be random. In still yet other examples, the top deck 102 has a single area with a uniform pattern or random pattern across the entire deck 102.

A wide variety of different packing arrangements of core pieces 703 can be used to form the core patterns 704. Moreover, different combinations of zones with different packing arrangements of core pieces 703 can be incorporated into the pallet 100. In the illustrated example, the core pattern 704 has a generally uniform arrangement. Again, the core patterns 704 in other examples can include nonuniform packing arrangements of the core pieces 703. In the illustrated examples, the core pattern 704 has a honeycomb type arrangement. A wide variety of packing arrangements and core piece shapes can be used. By way of nonlimiting examples, the core pattern 704 can include a triangular pattern, a tri-hexagonal pattern, an elongated triangular pattern, a truncated square pattern, a truncated trihexagonal pattern, a truncated hexagonal pattern, a snub square pattern, a rhombitrihexagonal pattern, and a snub hexagonal pattern, to name a few. In the illustrated examples, the core pieces 703 have hexagonal shapes, but the core pieces 703 can be shaped differently in other examples and/or a combination of differently shaped core pieces 703 can be used.

Figure 11:
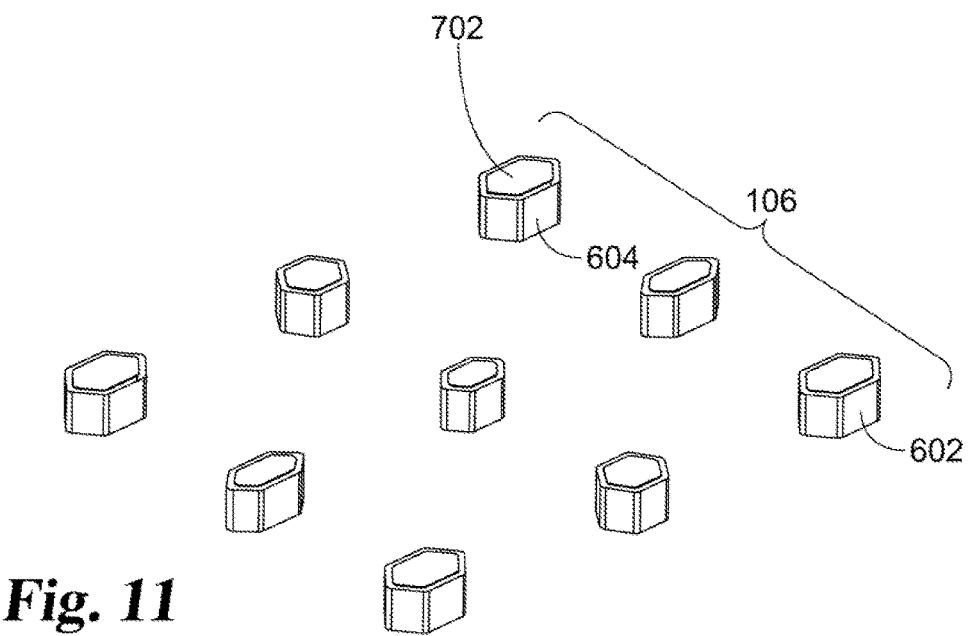
FIG. 11 is a perspective view of a spacer structure of the FIG. 1 pallet.

FIG. 11 shows a perspective view of the blocks 602 that form the spacer structure 106. To reduce the risk of chipping or breakage created by sharp corners as well as to guide the forks, the corners of the blocks 602 have a beveled shape so that the cores 702 have an overall hexagonal shape. In other examples, the cores can be shaped differently, such as by having circular (cylindrical), triangular, or even rectangular shapes. As shown, each block includes the core 702 which is surrounded by the exterior or outer skin 604 of concrete. While the cores 702 in the blocks are solid, it is envisioned in other embodiments that the core can have various core patterns 704. The ends of the cores 702 in the blocks 602 are exposed in the illustrated example, but the material forming the core 702, such as polystyrene foam, is protected once the pallet 100 is assembled. The ends of the blocks 602 are adhered inside the collars 802 of the decks 102, 104.

Figure 12:
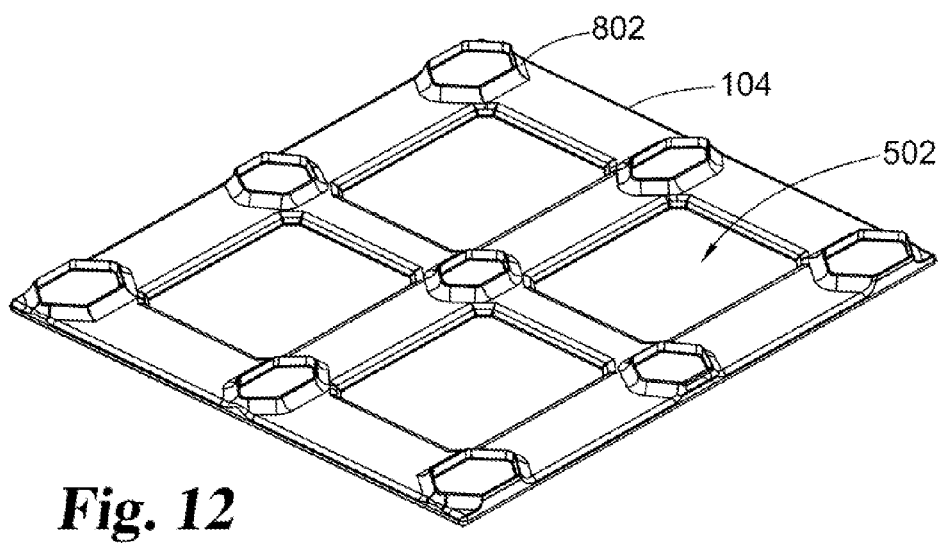
FIG. 12 is a top perspective view of a bottom deck of the FIG. 1 pallet.
Figure 13:
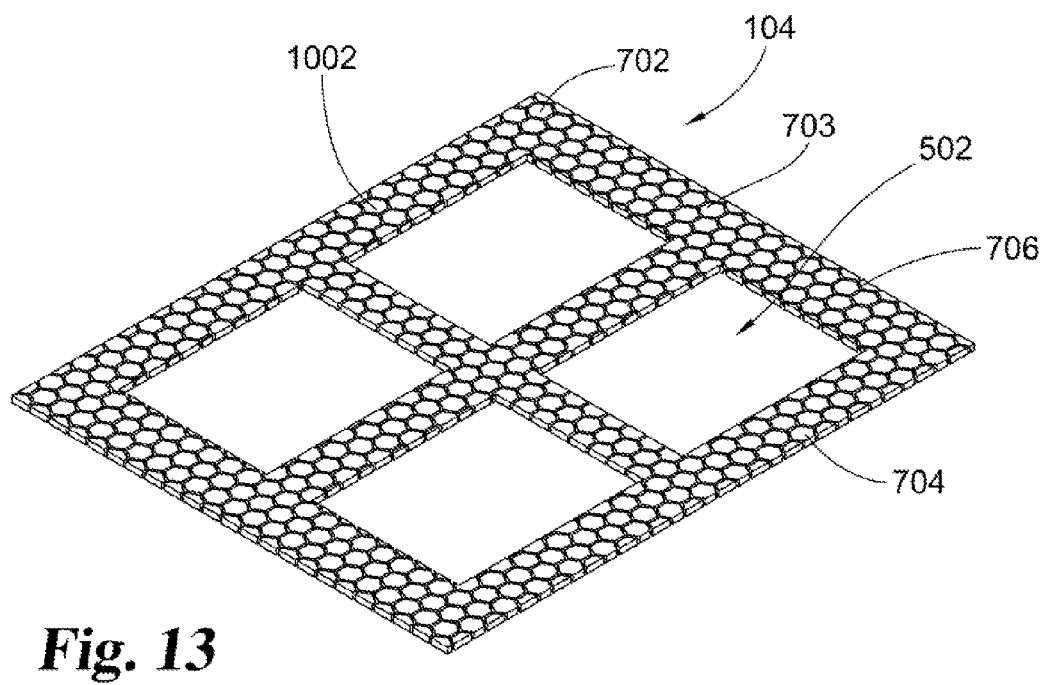
FIG. 13 is a perspective view of a core located inside the FIG. 12 bottom deck.

FIG. 12 shows a top view of the bottom deck 104 of the pallet 100. Like the top deck 102, the bottom deck 104 has collars 802 in which the ends of the blocks 602 are received. The blocks 602 are secured to the decks 102, 104 via adhesive in one example, but the blocks can be secured in other ways in other examples, such as via fasteners or interlocking structures. FIG. 13 shows a perspective view of the core 702 and the core pattern 704 for the bottom deck 104. As depicted, the core pattern 704 for the bottom deck 104 has the same support area 1002 pattern found in the top deck 102. This allows the core patterns 704 for both decks to use the same or similar tooling during manufacturing which in turn simplifies processing. Unlike the core pattern 704 for the top deck 102, the bottom deck 104 does not include the filler area so that the jack openings 502 can be formed. It should be recognized that different core patterns and areas can be used to create the core 702 of the bottom deck 104.

Figure 14:
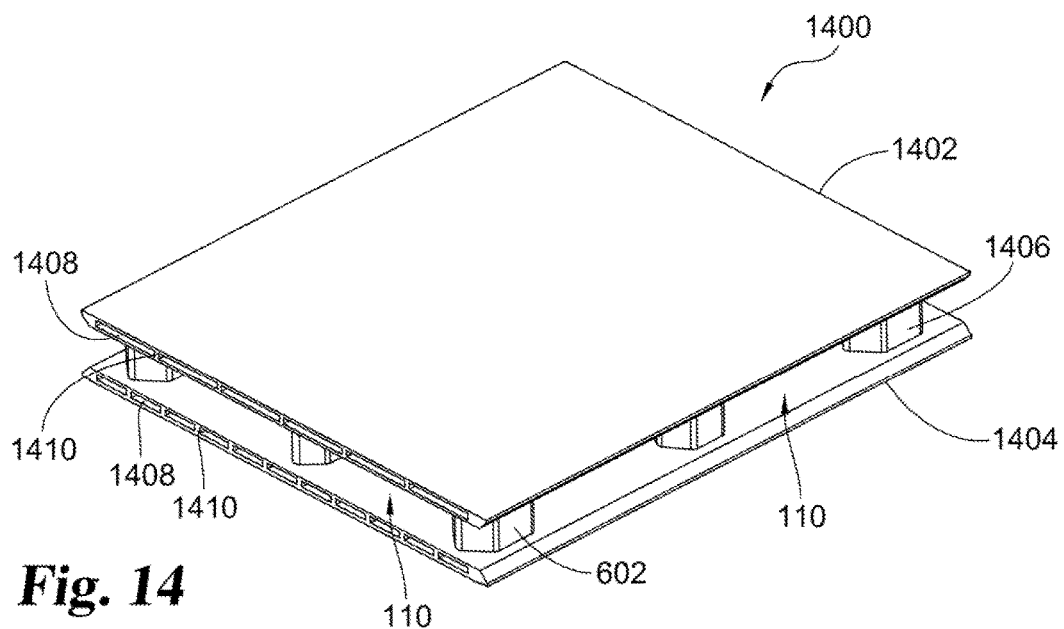
FIG. 14 is a perspective view of a pallet according to another embodiment.
Figure 15:
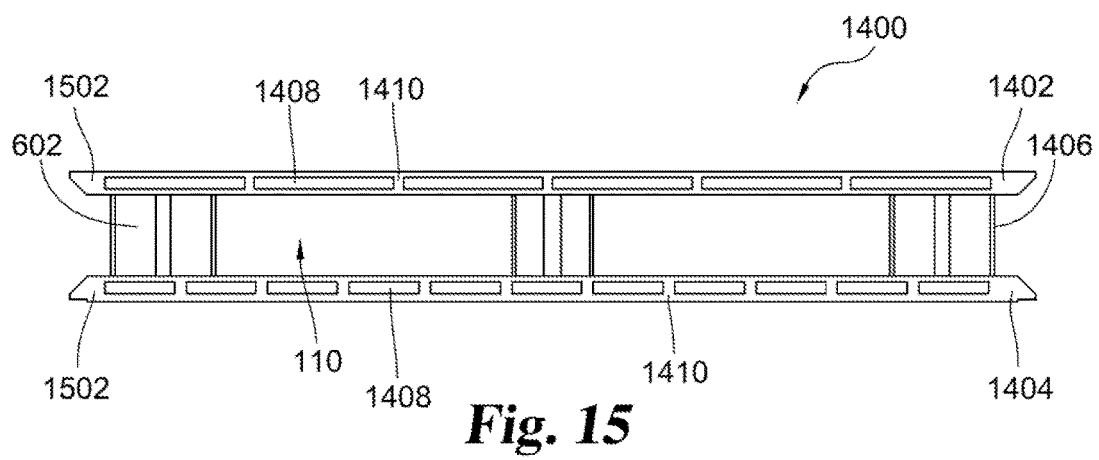
FIG. 15 is an end view of the FIG. 14 pallet.

A pallet 1400 made of concrete according to another embodiment that is manufactured through an extrusion process will be described with reference to FIGS. 14, 15, and 16. As will be recognized, this pallet 1400 shares a number of features in common with the pallet 100 described above. For example, the pallet 1400 is made of the same material as described above, such as the types of concrete (e.g., fiber reinforced concrete, ECC, etc.) and other materials described above for the FIG. 1 pallet 100. For the sake of brevity and clarity, these common features will not be described again in detail, but reference is made to the previous description of these features. As shown, the pallet 1400 includes a top deck 1402, a bottom deck 1404, and a spacer structure 1406 spacing apart the decks 1402, 1404 to create the fork openings 110. In the illustrated example, at least the main components of the pallet 1400, such as the decks 1402, 1404 and spacer structure 1406, are created through an extrusion process. Using an extrusion process in turn helps to enhance manufacturing throughput by creating the components in a continuous or nearly continuous fashion.

Both the top deck 1402 and the bottom deck 1404 each have one or more deck cavities 1408 created during the extrusion process that help reduce the overall weight of the pallet 1400. As shown, the deck cavities 1408 extend for the entire length of the decks 1402, 1404 and are separated from one another by support ribs 1410. The support ribs 1410 help strengthen the decks 1402, 1404. Air can be circulated into the deck cavities 1408 to promote curing. If so desired, core material, such as polystyrene foam, can be filled into the cavities 1408 to promote dampening. In another example, one or more reinforcing rods extend in the cavities 1408 or are embedded in the support ribs 1410 to further reinforce the decks 1402, 1404. As can be seen in FIG. 15, the decks 1402, 1404 have beveled edges 1502 that are beveled in order to reduce the risk of chipping as well as to facilitate guiding of the forks into the fork openings 110. Like the FIG. 1 pallet 100, the bottom deck 1404 of the pallet 1400 has jack openings 502, as is shown in FIG. 16.

Figure 16:
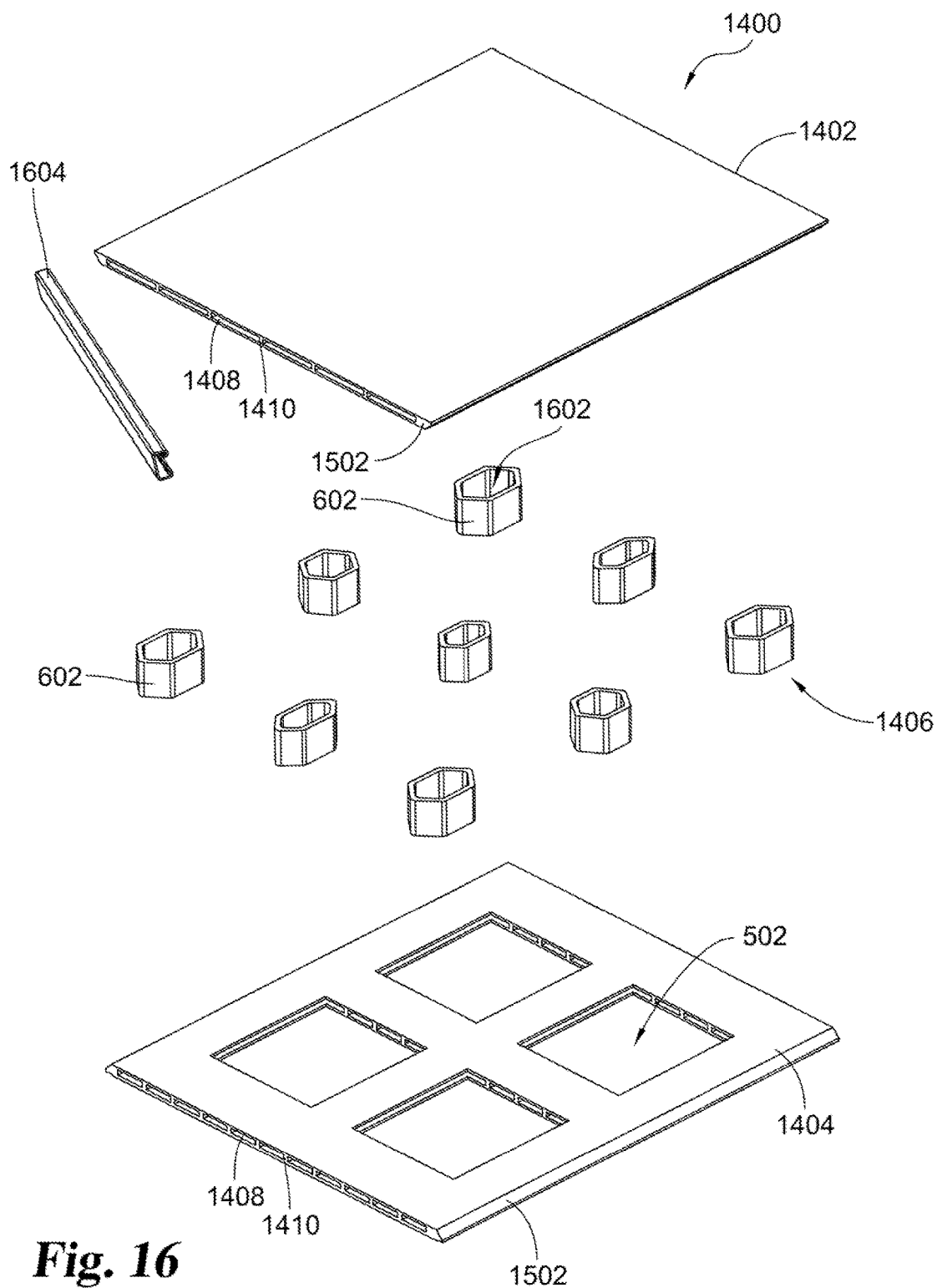
FIG. 16 is an exploded view of the FIG. 14 pallet.
Figure 17:
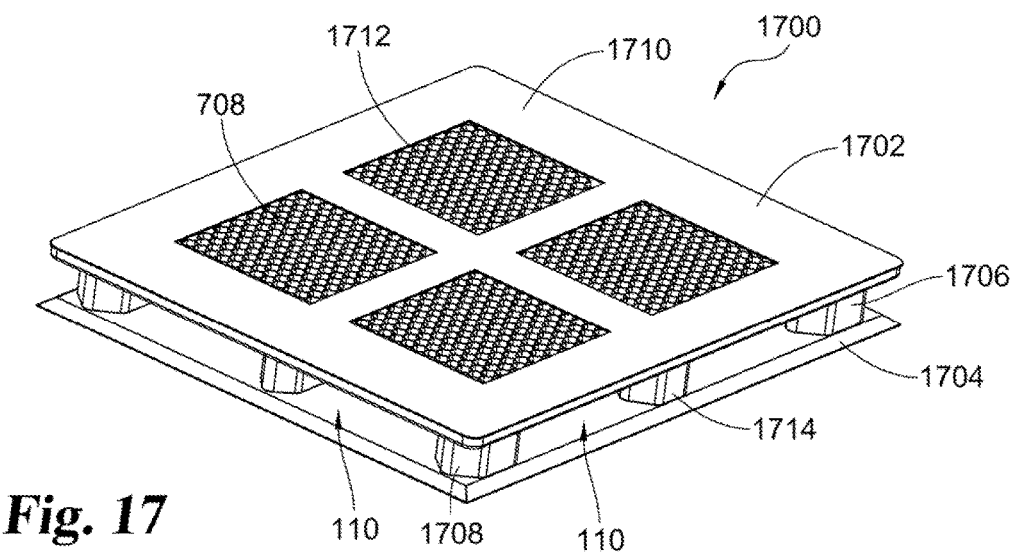
FIG. 17 is a perspective view of a pallet according to a further embodiment.

The spacer structure 1406, as is depicted in the exploded view of the pallet 1400 in FIG. 16, includes the blocks 602 of the type described above. The blocks 602 in the illustrated example are formed through an extrusion process, but in other examples the blocks 602 can be molded or formed in some other way. Unlike the blocks 602 of the FIG. 1 pallet 100, the blocks 602 have block cavities 1602 that are empty and not filled with any core material. The block cavities 1602 reduce the weight of the pallet 1400 and facilitate curing. In other examples, all or some of the block cavities 1602 can be filled with core material, such as polystyrene foam. To help reduce damage to the pallet 1400 as well as other objects, the pallet 1400 includes a bumper 1604 configured to cover one or more edges and/or corners of the decks 1402, 1404. The bumper 1604 can be made from a variety of materials such a rubber and plastic.

FIGS. 17, 18, 19, and 20 illustrate a pallet 1700 according another embodiment. Like the previous embodiments, the pallet 1700 includes a top deck 1702, a bottom deck 1704, and a support structure 1706 that forms the fork openings 110 between the decks 1702, 1704. For the sake of brevity and clarity, features common to the previously discussed pallet designs will not be discussed in great detail, but reference is made to the previous description of those features. In the illustrated example, the top deck 1702 and the support structure 1706 are integrally formed together to create a unitary structure. In particular, the support structure 1706 includes a casing 1708 that forms at least in part a mold into which the concrete is poured. In one form, the casing 1708 is made of plastic, but it should be appreciated that the casing 1708 can be made of other materials, such as metal or cardboard. The casing 1708 also aids in protecting the pallet 1700 from chipping or otherwise breaking when struck by a fork or other object. The concrete includes the types of concrete discussed above as well as defined herein, such as FRC, ECC, and the like. Once molded, the top deck 1702 includes a cross support area 1710 and a lattice area 1712. The cross support area 1710 in one form is filled with solid concrete, but in other examples the cross support area 1710 can include core material or cavities of the types described above in order to reduce the weight and/or strengthen the pallet 1700. In the illustrated example, the lattice areas 1712 in the top deck 1702 generally correspond to the same locations of the jack openings 502 in the bottom deck 1704 to promote drainage and/or airflow, but in other examples the lattice areas 1712 can be located elsewhere and in different patterns than is shown. The lattice area 1712 helps to reduce the weight of the pallet 1700 as well as provide support for objects on the top deck 1702. In the illustrated example, the lattice 708 in the lattice area 1712 has a honeycomb pattern with open cells so as to facilitate air flow and drainage, but it should be recognized that the lattice can be shaped differently in other examples. In one form, the lattice 708 in the lattice area 1712 is made of concrete that is integrally molded with the cross support area 1710 of the top deck 1702 when formed. In another form, the lattice 708 in the lattice area 1712 is made of plastic or metal that is embedded in the in the top deck 1702.

Figure 18:
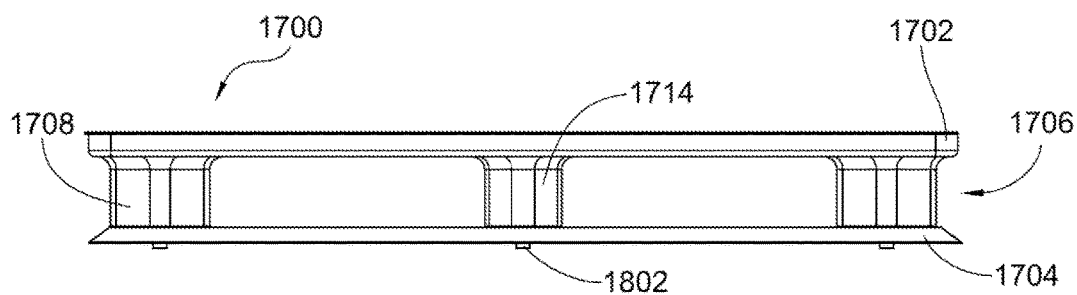
FIG. 18 is a side view of the FIG. 17 pallet.
Figure 19:
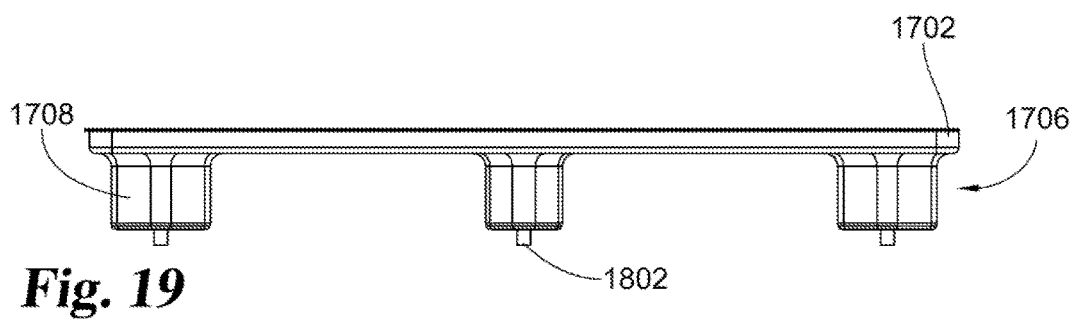
FIG. 19 is a side view of a support structure found in the FIG. 17 pallet.
Figure 20:
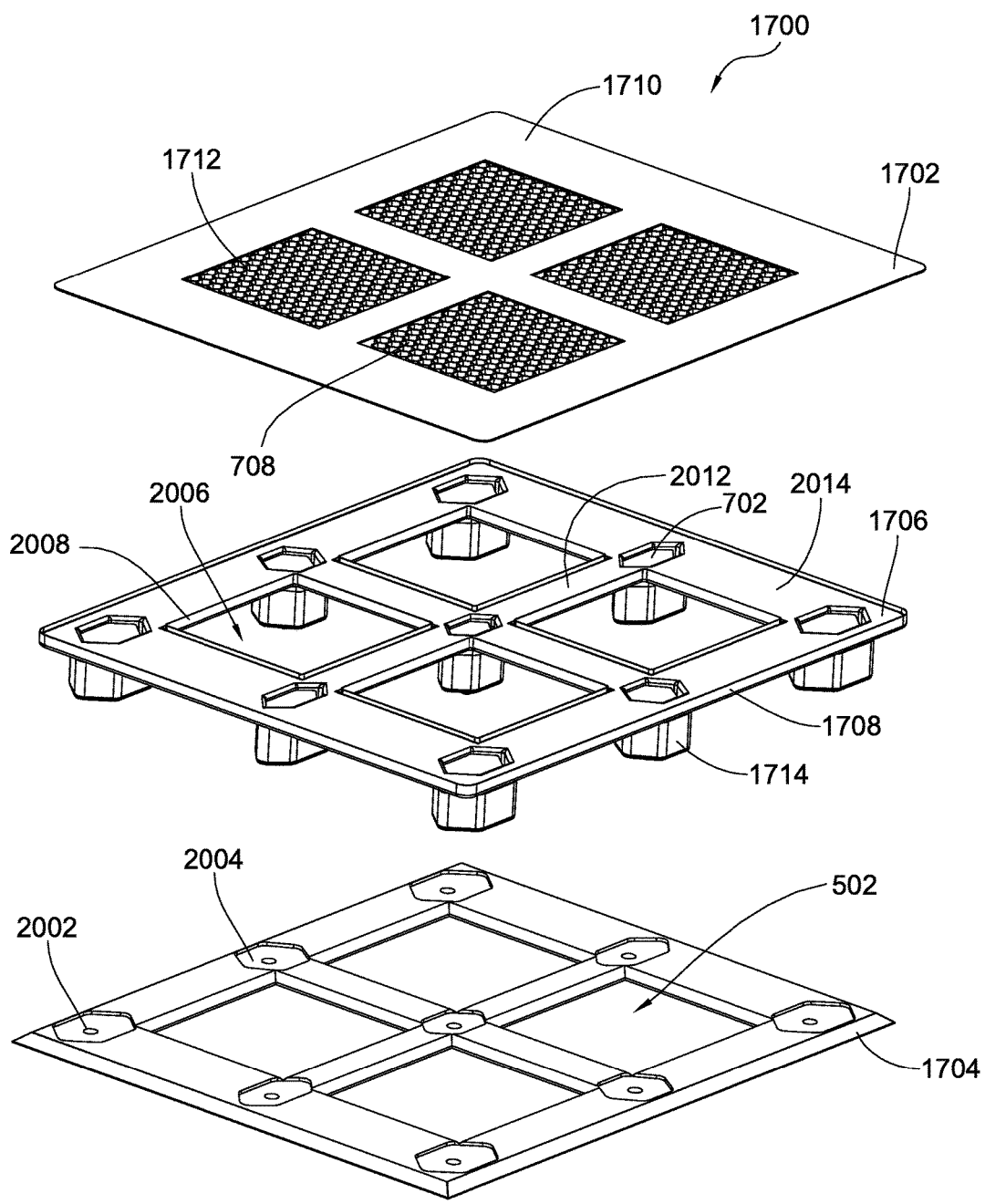
FIG. 20 is a perspective view of the FIG. 17 pallet.

The casing 1708 of the support structure 1706 includes one or more legs or blocks 1714 that space the top deck 1702 from the bottom deck 1704 to form the fork openings 110. In the illustrated example, the blocks 1714 have hexagonal cross-sectional shapes so as to reduce the risk of chipping or otherwise damaging the pallet, but it should be recognized that the legs can be shaped differently in other examples. The ends of the blocks 1714 have alignment pins or protrusions that align the top deck 1702 with the bottom deck 1704, as is depicted in FIGS. 18 and 19. In certain variations, such as shown in FIG. 19, the pallet 1700 does not have a bottom deck 1704 such that the pallet 1700 is in the form of a skid. Turning to FIG. 20, the cross support area 1712 of the casing 1708 includes a cross support 2012 with an outer peripheral member 2014 that form a series of rectangular window openings 2006. The cross support 2002 and the peripheral member 2004 of the casing 1708 have edge walls 2008 that retain the concrete such as around the window openings 2006. The alignment pins 1802 are received into corresponding alignment openings 2002 in the bottom deck 1704. Around the alignment openings 2002, the bottom deck 1704 has block cavities or recesses 2004 configured to stabilize the relative positions of the blocks 1714 and the bottom deck 1704 so as to minimize any slippage or relative movement. In one form, the bottom deck 1704 is secured to the support structure 1706 via an interference fit between the alignment pins 1802 and openings 2002. Alternatively or additionally, the bottom deck 1704 and the support structure 1706 can be secured with an adhesive. It should be recognized that the bottom deck 1704 and support structure 1706 can be secured in other manners, such as through various types of fasteners.

During manufacturing, cores 702, such as those made with polystyrene foam, are inserted into the blocks or legs 1714 of the casing 1708. In other examples, the polystyrene foam and/or other core materials are injected into interior voids to form the cores 702. The cores 702 in some examples reduce the overall weight of the pallet 1700 as well as promote dampening in order to reduce damage to the pallet 1700. In other examples, the blocks 1714 do not include cores 702 but are instead made of solid concrete in order to enhance pallet load capabilities. Concrete is poured into the casings 1708 such that the cores 702 are encased in the concrete. Additional mold tooling forms the lattice areas 1712 when made of concrete. In other variations, lattices 708 are made of other materials, such as plastic or metal, that are embedded in the concrete in the casing 1708. A molding process is also used to form the bottom deck 1704. The casing 1708 allows the top deck 1702 and support structure 1706 to be attached to the bottom deck 1704 even before the concrete fully cures. In other examples, the top deck 1702, support structure 1706, and bottom deck 1704 are attached after fully curing. As mentioned before, $CO_2$ curing in some examples is used to accelerate curing. Again, the top deck 1702 and bottom deck 1704 can be attached together (or not) in a number of manners such as view adhesives, frictional fits, and/or fasteners.

Figure 21:
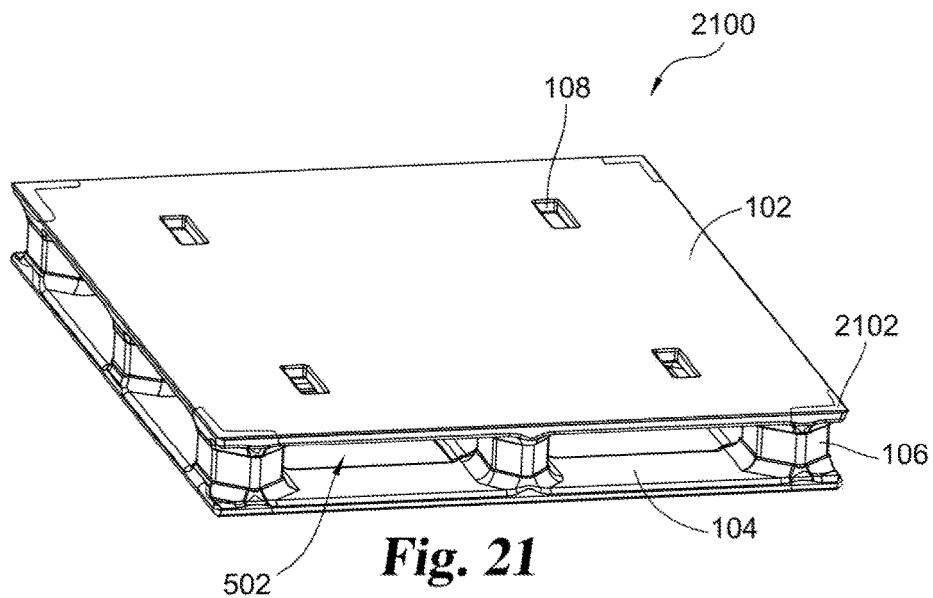
FIG. 21 is a perspective view of a pallet according to another embodiment.

FIG. 21 shows a perspective view of a pallet 2100 according to another embodiment. As can be seen, the pallet 2100 in FIG. 21 shares a number of features in common with the pallet 100 described with respect to FIGS. 1-13. As an example, the pallet 2100 in FIG. 21 generally includes the top deck 102, bottom deck 104, and the spacer structure 106 of the type described before. For the sake of brevity and clarity, these common features will not be described again in detail, but please refer to the previous discussion of these features. As depicted, the pallet 2100 includes one or more bumpers 2102 attached to the corners of the pallet 2100 in order to minimize damage to the pallet 210, such as chipping or spalling of the concrete, as well as protect items or personnel from being damaged or injured by the pallet 2100. In one form, the bumpers 2102 are made from a resilient material, such plastic or rubber, but in other examples, the bumpers 2102 can be made from other materials configured to protect the concrete forming the pallet 2100. When positioned on the bottom deck 104, the bumpers 2102 can also act as shock absorbers between the ground or other objects upon which the pallet 2100 is placed.

Figure 22:
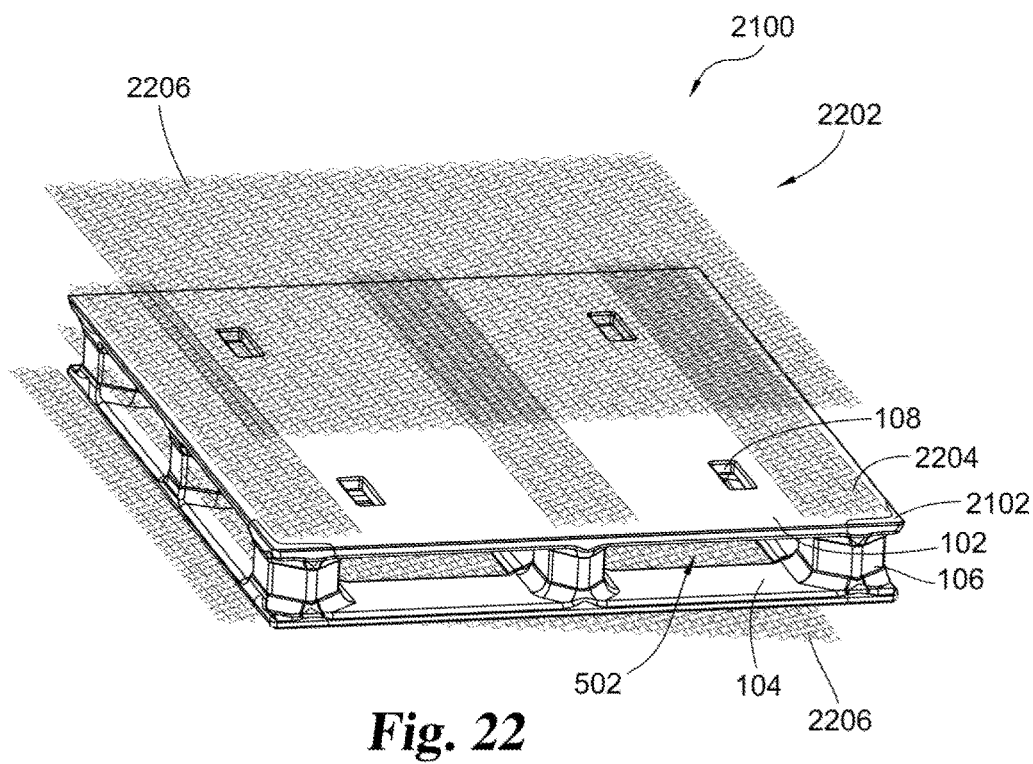
FIG. 22 is a partial exploded view of the FIG. 21 pallet.
Figure 23:
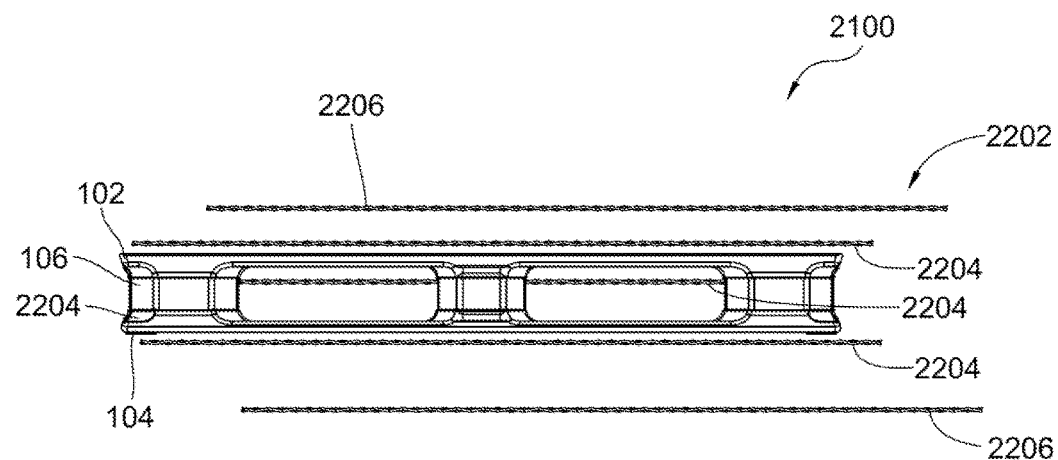
FIG. 23 is a side exploded view of the FIG. 21 pallet.

To reinforce the pallet 2100 against various loads, such as tensile forces, the pallet 2100 includes one or more meshes 2202. FIGS. 22 and 23 show perspective and side views of the pallet 2100 in which the meshes 2202 are removed or exploded from the rest of the pallet 2100. Normally, the meshes 2202 are embedded inside the concrete of the pallet 2100 so as to reinforce the concrete. The meshes 2202 in one form are made of metal wire, and in other examples, the reinforcement meshes are made of natural and/or synthetic fibers. In the illustrated example, the meshes 2202 are in the form of scrim sheets, but it should be recognized that the reinforcement meshes 2202 can be configured differently in other examples. As shown, the meshes 2202 include scrim strips 2204 and scrim overlay sheets 2206. In one form, the scrim strips 2204 and overlay sheets 2206 are made of fiber glass. The scrim strips 2204 extend longitudinally along the pallet 2100 in a direction similar to that of a pallet stringer. Looking at FIGS. 22 and 22, the scrim strips 2204 are embedded in opposing sides of each deck 102, 104 to provide additional strengthening. The scrim overlay sheets 2206 generally cover the external faces of the decks 102, 104. Various openings such as those corresponding to the hand openings 108 and jack openings 502 can be cut or otherwise formed in the scrim overlay sheets 2206. It should be recognized that the reinforcement meshes can be patterned in other manners than is shown in the drawings.

Figure 24:
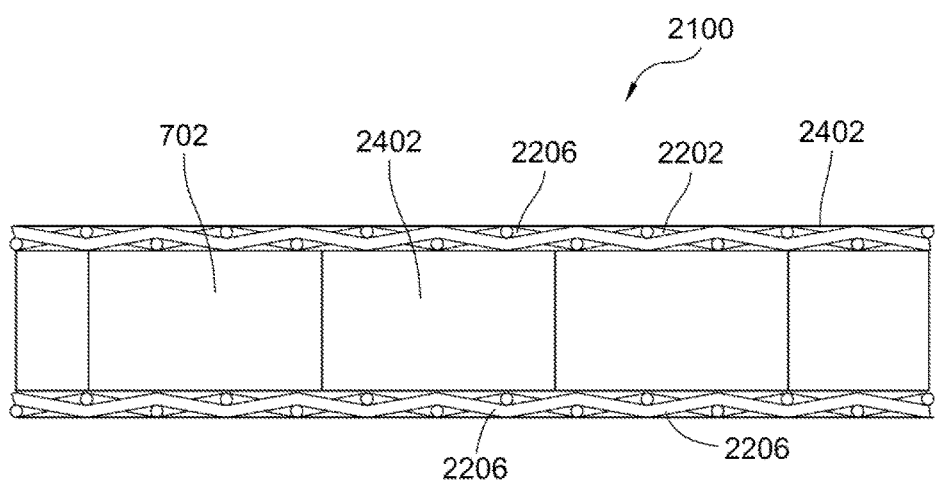
FIG. 24 is an enlarged cross-sectional view of the various layers in the FIG. 21 pallet.

FIG. 24 shows an enlarged cross-sectional view of one of the decks in the pallet 2100. As depicted, the pallet 2100 includes mesh 2202 in the form of scrim strips 2204 embedded inside concrete 2402. The concrete 2402 forms an outer skin or surface of the pallet 2100. One or more cores 702 are sandwiched between the scrim strips 2204, and the concrete 2402 fills in the spaces between the cores 702. This construction provides a lightweight, yet strong pallet 2100. The core material can dampen impacts and other compressive loads, and the mesh 2202 can help to resist tensile loads during impact as well as when the pallet 2100 is loaded and/or moved.

Figure 25:
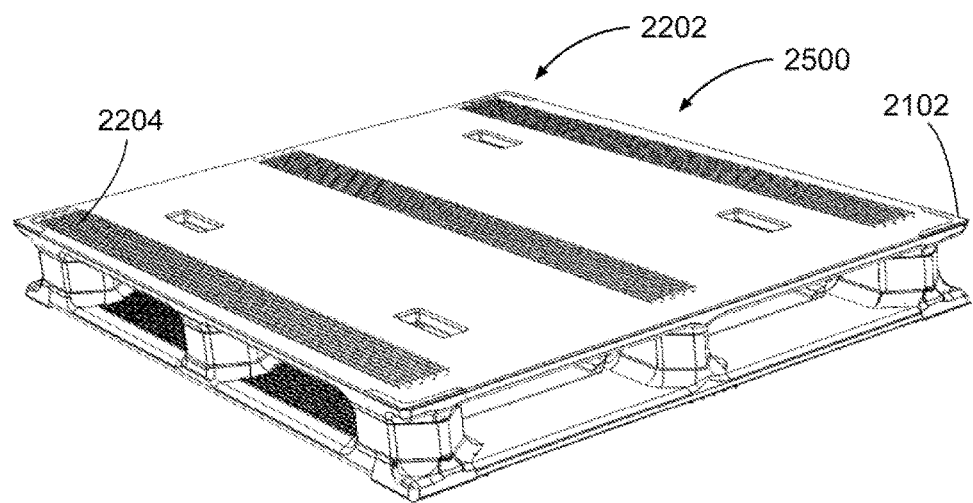
FIG. 25 is a top perspective view of a pallet according to still yet another embodiment.
Figure 26:
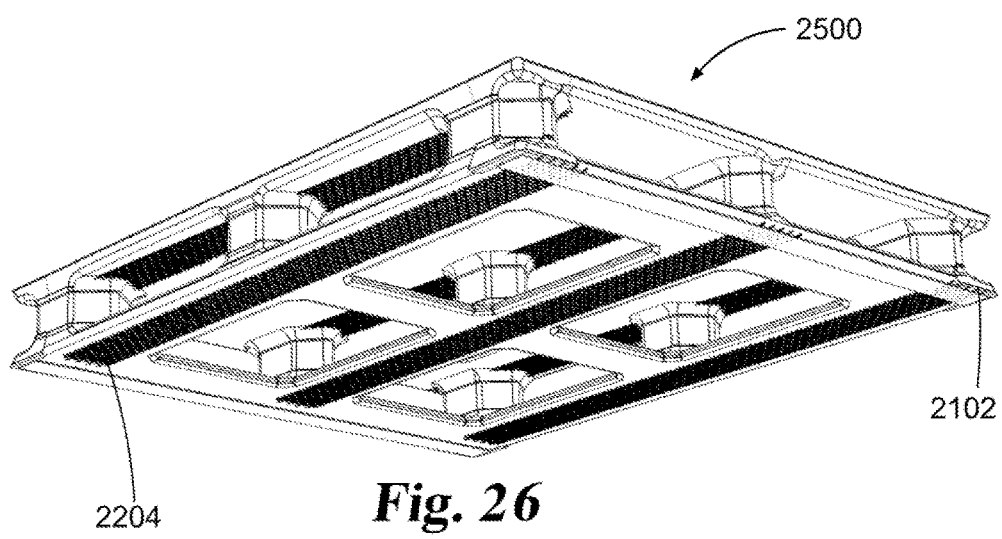
FIG. 26 is a bottom perspective view of the FIG. 25 pallet.

FIGS. 25 and 26 show top and bottom perspective views of a pallet 2500 that includes a mesh 2202 with scrim strips 2204 extending along the length of the pallet 2500. In this illustrated example, the pallet 2500 includes the scrim strips 2204, but it does not include the scrim overlay sheet 2206 that is shown in FIG. 22. The pallet 2500 is configured in a similar fashion and includes the same components as the ones previously described, such as the one described with reference to FIG. 21. The scrim strips 2204 are typically, but not always, embedded within the pallet 2500, but FIGS. 25 and 26 show them so that there is a better appreciation of how the scrim strips 2204 extend within the pallet.

Figure 27:
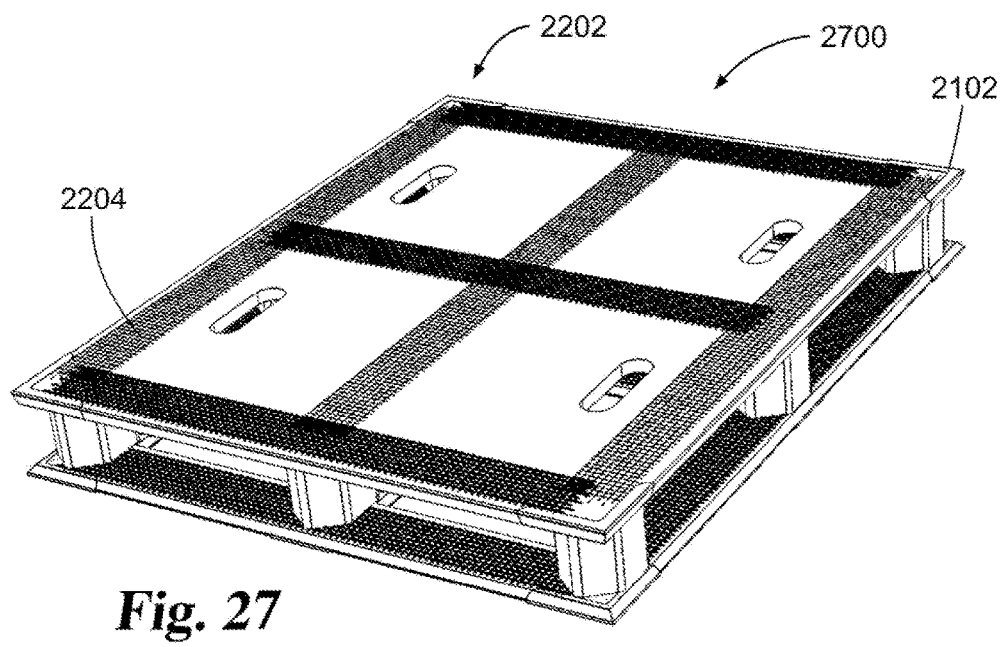
FIG. 27 is a top perspective view of a pallet according to a further embodiment.
Figure 28:
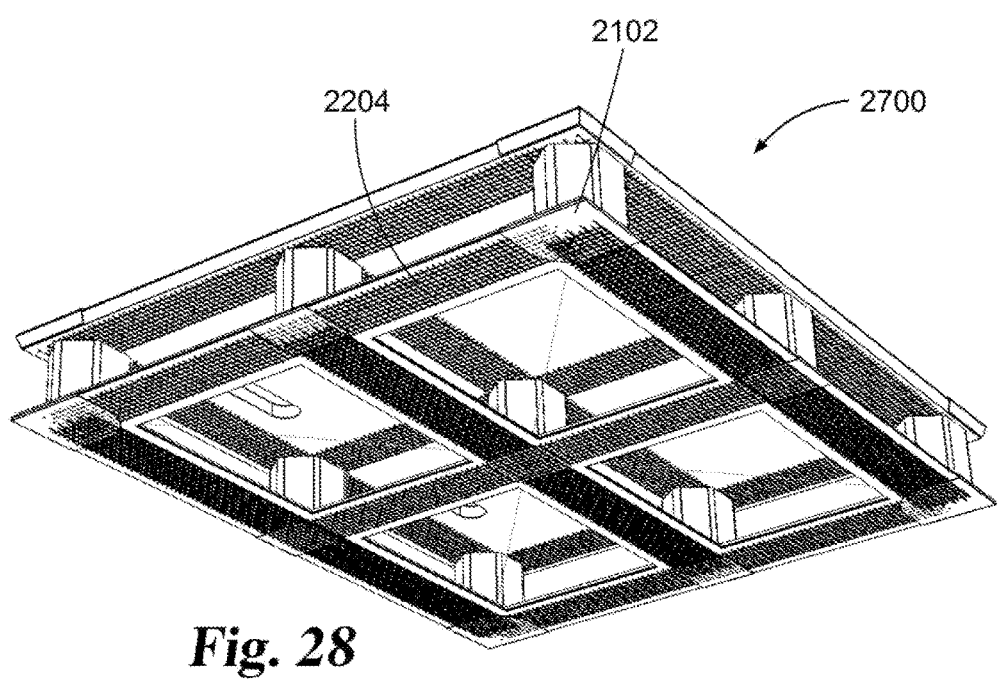
FIG. 28 is a bottom perspective view of the FIG. 27 pallet.

FIGS. 27 and 28 show a pallet 2700 with the reinforcement mesh 2202 having a different pattern of the scrim strips 2204 as compared to the previous pallet designs. In this example, the scrim strips 2204 extend around the perimeter of the pallet 2700 and further form a cross pattern within the pallet 2700. It should be recognized that this configuration of the scrim strips 2204 provides additional strength to the pallet 2700.

Figure 29:
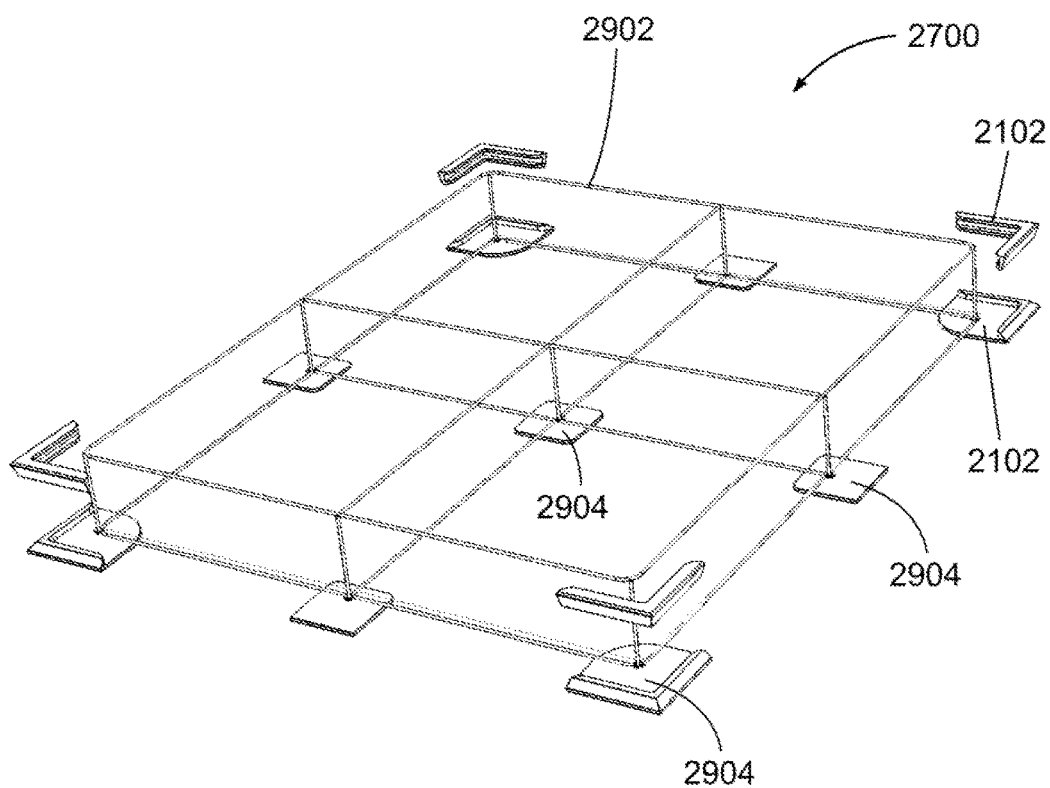
FIG. 29 is a perspective view of the FIG. 27 pallet with the concrete removed to show rebar that is used to reinforce the FIG. 27 pallet along with corresponding bumpers.

FIG. 29 shows a perspective view of the pallet 2700 with the concrete and reinforcement mesh 2202 removed. As can be seen, the pallet 2700 has a reinforcement structure 2902 that is located inside the concrete of the decks and supports that form the pallet 2700. The reinforcement structure 2902 provides additional tensile strength for the pallet 2700. Like with the other examples, the pallet 2700 includes the core materials that form the various components and structures inside the pallet 2700 in the same manner as was discussed before. This reinforcing structure 2902 extends through the core as well as the concrete material that forms the pallet 2700. In one example, the reinforcement structure 2902 is made from material having higher tensile strength as compared to concrete that is used for the rest of the pallet. In one particular example, the reinforcement structure 2902 is in the form of rebar or reinforced steel rods that extend within the decks as well as through the support legs of the pallet. As can also be seen in FIG. 29, the bumpers 2102 include support pads 2904 that are positioned to support the bottom deck of the pallet 2700. The support pads 2904 can be incorporated into the corner bumpers as well as in other structures. The support pads 2904 are typically but not always made of material that reduces damage or scuffing of items, such as a hardened plastic. It should be recognized that the reinforcement structure 2902 as well as the support pads 2904 can be incorporated into the other pallets that were previously described and illustrated herein as well as in other types of pallets.

Various types of materials can be used to form the above-described pallets. By way of non-limiting examples, all or part of these pallets can be made of concrete, such as FRC, ECC, lightweight ECC, self-compacting ECC, sprayable ECC, and/or extrudable ECC. The concrete can further contain air voids, glass bubbles, polymer spheres, and/or lightweight aggregate. The concrete in the pallet can be reinforced by other structures such as by rebar. The entire pallet or components thereof can be formed or otherwise manufactured by a number of processes, such as by molding, dry casting wet casting, monolithic casting, extruding, and/or spraying processes. The concrete can be cured through normal curing processes or curing can be accelerated by exposing the concrete to $CO_2$. Alternatively or additionally, the concrete is cured through a steam curing process and/or via an autoclave that applies pressure or a vacuum to the formed pallet.

Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Concrete" generally refers to a material made from a mixture of broken stone or gravel, sand, cement, and water that can be spread/poured into molds and/or extruded to form a stone like mass on hardening.

"Core" generally refers to a solid or semi-solid material located in an interior of a pallet and/or a component (or portion) thereof. The core is generally made of material having one or more different properties, such as mechanical, chemical, and/or physical properties, as compared to the rest of the pallet. For example, when the pallet is made of concrete, the core can have a density, resilience, hardness, compressibility, and/or strength different from the concrete. By way of non-limiting example, the core can be made from polystyrene foam that is less dense than the concrete when the rest or most of the pallet is made of concrete. In another non-limiting example, the core can be made of ultra-lightweight concrete that has a lower density as compared to the concrete forming generally the rest of the pallet. The core can have a unitary structure or can be made of multiple components oriented, joined, and/or otherwise aggregated together. The components of the core can be arranged in a repeating or nonrepeating pattern, or can have no pattern. In one nonlimiting example, the core can have a hexagonal pattern, but the core can have other patterns (or none) in other examples.

"Deck" generally refers to a surface of a pallet, including one or more boards and/or panels, with or without space between the elements. Pallets can typically include one or more of the following types of decks:

"Top Deck" generally refers to one or more panels and/or assemblies of boards that form the load carrying face of the pallet on which goods or items are supported.

"Bottom Deck" generally refers to one or more panels and/or assemblies of boards that form the load-bearing surface of the pallet that typically rests against another object such as the floor, ground, other pallet, and/or other unit load. The bottom deck usually, but not always, includes jack openings that allow pallet jack wheels to engage the floor or ground.

The directional terms "top" and "bottom" when referring to these types of deck are common nomenclature used in industry, and it is not the intent that these directional terms limit the types of decks to a specific orientation or direction. For example, in a reversible pallet, the pallet has identical or similar top and bottom decks that can be flipped on either face of the pallet to support the unit load.

"Engineered Cementitious Composite" (ECC), also known as "bendable concrete" or "engineered cementitious concrete", generally refers to a type of concrete composite material that is reinforced with short random polymer fibers, such as polyvinylalcohol (PVA) fibers. These polymer fibers may be used in a low volume fraction, such as 2-3% by volume, in a concrete mixture to create a concrete matrix with greater tensile strain capacities than a traditional concrete mixture. In other words, ECC is one specific species of fiber reinforced concrete (FRC) that uses polymer fibers so as to provide superior qualities. Unlike regular concrete, ECC has a strain capacity in the range of 3-7%, compared to 0.1% for Ordinary Portland Cement (OPC). ECC therefore acts more like a ductile metal than a brittle glass (as does OPC concrete). Tests done on ECC material have shown a higher relative strength in tension, greater resistance to catastrophic fatigue cracking, increased durability under reversed loading, and greater dynamic tensile loading capability under projectile impact. More specifically, in some cases, the tensile strain capacity may be approximately 500 times greater than that of standard concrete aggregate mixtures. In one example, the polymer fibers in the concrete mixture are selected to optimize the concrete matrix for the highest tensile strain capacity. PVA fibers are often selected due to the high chemical bonds between the PVA fiber and the concrete and/or the appropriate frictional stresses at this interface. If the chemical bond and/or frictional interface between the fiber and the concrete mixture is too weak, the fibers will pull out and not transmit force across any microcracks that may form in the ECC. If the interaction between the fibers and the concrete mixture is too strong, the fibers will not stretch properly and the supporting concrete matrix may rupture. In one embodiment, the strength of the interaction between the fibers and the concrete mixture is in a selected range such that when microcracks form, they will propagate to other locations in the concrete matrix, thus causing strain hardening in the macro level of the ECC material. There are a number of different varieties of ECC.

"Lightweight ECC" or "low density ECC" generally refers to ECC that contains air voids, glass bubbles, polymer spheres, and/or lightweight aggregate. Compared to other lightweight concretes, lightweight ECC has superior ductility.

"Self-compacting ECC" generally refers to an ECC material that can flow under its own weight. For instance, a self-compacting ECC material is able to fill a mold containing elaborate pre-positioned steel reinforcement without the need of vibration or shaking to ensure even distribution. Self-compacting ECC contains chemical admixtures to decrease viscosity and control particle interactions with mix proportioning.

"Sprayable ECC" generally refers to an ECC material that is able to be pneumatically sprayed. Sprayable ECC includes one or more superplasticizing agents and viscosity-reducing admixtures.

"Extrudable ECC" generally refers to an ECC material that is formulated for extrusion. Extrudable ECC materials have both higher load capacity and higher deformability than other extruded fiber-reinforced composite materials.

"Fiber Reinforced Concrete" (FRC) generally refers to concrete containing fibrous material which increases its structural integrity. FRC contains short discrete fibers that are uniformly distributed and randomly oriented. These fibers can include steel fibers, glass fibers, synthetic fibers, and/or natural fibers that tend to vary the properties to the concrete. The characteristics of FRC can change by changing concretes, fiber materials, geometries, distribution, orientation, and/or densities.

"Lattice" generally refers to an interlaced structure or pattern. All or part of the lattice can have repeating, non-repeating, and/or random patterns, or no discernable pattern. In one non-limiting example, the lattice has a hexagonal or honeycomb pattern, and in other examples, the lattice can have a rectangular or triangular pattern.

"Mesh" generally refers to a material made of a network of wires, fibers, threads, and/or other flexible/ductile materials. In one example, the mesh is in the form of woven fabric like structure such as a scrim, gauze, or screen type material. In another example, the mesh is not woven but the intersecting cross fibers or strands form a unitary structure. The mesh can have varying hole patterns depending on how the fibers or strands are oriented relative to one another. For example, the mesh can have hexagonal and/or rectangular hole patterns (or not). The mesh can be made from a variety of materials including, but not limited to, fiberglass, metal, plastic, carbon fibers, synthetic fibers, and/or natural fibers, to name a few. The mesh can be treated. For example, the mesh can be coated with other materials so as to improve adhesion to concrete or other materials.

"Microspheres" or "Microparticles" generally refer to small typically spherical particles, with diameters in the micrometer range (usually 1 µm to 1000 µm). Microspheres are generally made from various natural and synthetic materials. The microspheres can be made from recycled material. Glass microspheres, polymer microspheres, and ceramic microspheres are common types of microspheres. More specifically, microspheres can include glass, polyethylene, polystyrene, and/or expandable microspheres. The microspheres can be solid or hollow and can vary widely in density.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top deck upon which items are stacked, a bottom deck that rests on the ground, and a spacer structure positioned between the top and bottom decks to receive the forks of the forklift or pallet jack. However, the pallets can be configured differently. For example, the term pallet is used in a broader sense to include skids that have no bottom deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Polystyrene Foam" generally refers to a substance in which pockets of gas are trapped in a synthetic aromatic polymer made from the monomer styrene. In other words, polystyrene foam generally refers to a multicellular expanded and/or extruded synthetic resinous material. The polystyrene material is typically, but not always, foamed with the aid of a blowing agent, such as chlorofluorocarbon (now typically banned due to environmental concerns), pentane, and/or carbon dioxide gas blowing agents, to name just a few examples, in order to form bubbles in the polystyrene foam. The trademark STYROFOAM® by Dow Chemical Company is commonly used to refer to all forms of polystyrene foam products. The term polystyrene foam is used in a broad context to include expanded polystyrene (EPS) and extruded polystyrene.

"Spacer Structure" generally refers to any component, part, object, device, and/or assembly that separates the top deck from an object on which the pallet rests, such as the ground, floor, other pallet, and/or other unit load. By way of nonlimiting examples, the spacer structure can include one or more blocks, stringers, and/or other spacers. Typically, but not always, the spacer structure defines one or more fork entries that each form an entry for admitting one or more forks of a forklift or pallet jack. The fork entry can for instance be formed by the space created between the top and bottom decks by stringers and/or blocks as well as one or more notches in the stringers or other parts of the pallet to name just a few examples. In one form, the fork entries can be located on opposite ends of the pallet to create a two-way entry pallet, and in another form, the fork entries can be located on both opposite ends and opposite sides of the pallet to create a four-way entry pallet. In other examples, the spacer structure can include more or less, and even none, fork entries.

It should be noted that the singular forms "a", "an", "the", and the like as used in the description and/or the claims include the plural forms unless expressly discussed otherwise. For example, if the specification and/or claims refer to "an article" or "the article" it includes one or more of such articles.

Again, it should be recognized that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An article of manufacture, comprising:
   a pallet including
   a top deck,
   a bottom deck,
   a spacer structure joining together the top deck and the bottom deck, wherein the spacer structure includes one or more blocks defining one or more fork openings between the top deck and the bottom deck;
   wherein the top deck and the bottom deck each includes
      a casing made of metal, wherein each casing defines a cavity, and
   concrete contained inside at least part of the cavity in each casing, wherein each casing forms a mold in which the concrete is contained, wherein the concrete includes cement,
   reinforcement fibers embedded in the cement, and
   micro spheres embedded in the cement,
   wherein the casing of the top deck includes a cross support with an outer peripheral member,
   wherein the cross support has a cross pattern shape that subdivides the top deck into a series of rectangular window openings, and
   wherein the cross support and the outer peripheral member of the casing of the top deck have edge walls extending around the window openings.

2. The article of claim 1, wherein the concrete is Engineered Cementitious Composite (ECC), wherein the ECC includes the reinforcement fibers in the form of short random polymer fibers.

3. The article of claim 1, wherein the pallet defines one or more cavities that are at least partially filled with one or more cores.

4. The article of claim 3, wherein the one or more cores are less dense than the concrete.

5. The article of claim 3, wherein the one or more cores are more resilient than the concrete.

6. The article of claim 3, wherein the one or more cores include polystyrene foam.

7. The article of claim 3, wherein the one or more cores define a lattice of the concrete.

8. The article of claim 7, wherein the lattice has a honeycomb pattern.

9. The article of claim 7, wherein the lattice includes at least two areas having different lattice patterns.

10. The article of claim 9, wherein the at least two areas include a support area and a filler area.

11. The article of claim 10, wherein the top deck has the support area and the filler area.

12. The article of claim 11, further comprising:
   wherein the bottom deck defines one or more jack openings that correspond in location to the filler area in the top deck; and
   wherein the bottom deck includes a second lattice corresponding to the support area in the top deck.

13. The article of claim 1, wherein the spacer structure extends from top the deck, wherein the spacer structure includes the concrete.

14. The article of claim 13, wherein the spacer structure has one or more cores.

15. The article of claim 13,
   wherein the bottom deck includes one or more collars in which the blocks are received.

16. The article of claim 13,
   wherein the bottom deck includes one or more block recesses in which the one or more blocks are received.

17. The article of claim 13, wherein:
   the bottom deck includes one or more alignment openings; and
   the spacer structure includes one or more alignment protrusions received in the one or more alignment openings.

18. The article of claim 13, wherein the one or more blocks have a hexagonal shape.

19. The article of claim 13, wherein the top deck and the spacer structure form a unitary structure that includes the casing in which the concrete is disposed.

20. The article of claim 1, wherein the pallet includes one or more hand openings.

21. The article of claim 1, wherein the concrete is color dyed to identify the pallet.

22. The article of claim 1, wherein the pallet includes one or more bumpers.

23. The article of claim 1, the pallet includes a mesh embedded in the concrete to reinforce the concrete.

24. The article of claim 23, wherein the pallet includes one or more cores that are sandwiched between the mesh.

25. The article of claim 23, wherein the mesh includes a scrim strip extending in a longitudinal direction inside the pallet.

26. The article of claim 23, wherein the mesh includes an overlay scrim.

27. The article of claim 23, wherein the mesh includes scrim strips extending in a cross pattern.

28. The article of claim 1, wherein the pallet includes a reinforcement structure disposed inside the concrete.

29. The article of claim 28, wherein the reinforcement structure includes rebar.

30. The article of claim 1,
wherein the spacer structure is made of the concrete.

31. The article of claim 30, wherein the top deck and the spacer structure form a unitary structure that includes the casing in which the concrete fills.

32. The article of claim 30, wherein the top deck, the bottom deck, and the spacer structure contain one or more cores.

33. A method, comprising:
mixing reinforcement fibers and microspheres into cement to create concrete;
creating a first casing of a first deck that includes a cross support area with an outer peripheral member, wherein the cross support has a cross pattern shape that subdivides the first deck into a series of rectangular window openings, wherein the cross support and the outer peripheral member of the first casing have edge walls extending around the window openings, wherein the first casing is made of metal;
creating a second casing of a second deck that defines jack openings, wherein the second casing is made of the metal;
forming at least the first deck of a pallet by pouring the concrete into the first casing that contains to at least partially fill the cross support with the concrete, wherein the concrete is wet during the pouring of the concrete into the first casing;
forming the second deck of the pallet by pouring the concrete in the second casing to at least partially fill the second casing with the concrete, wherein the concrete is wet during the pouring of the concrete into the second casing,
curing the concrete in the first casing of the first deck, wherein the first casing remains with the concrete during the curing;
curing the concrete in the second casing of the second deck, wherein the second casing remains with the concrete during the curing; and
attaching the first deck to a second deck made of the concrete with a spacer structure in between to define one or more fork openings, wherein the first casing remains part of the first deck during said attaching, wherein the second casing remains part of the second deck during said attaching.

34. The method of claim 33, wherein the pallet includes one or more cores that are less dense than the concrete.

35. The method of claim 34, wherein the one or more cores include polystyrene foam.

36. The method of claim 34, wherein said forming includes creating one or more lattice patterns with the one or more cores.

37. The method of claim 33, wherein said forming includes creating the first deck and the spacer structure by filling the first casing with the concrete.

38. The method of claim 33, further comprising:
securing the spacer structure between the first deck and the second deck with an adhesive to define the fork openings.

39. The method of claim 33, wherein said forming includes embedding a mesh in the concrete.

40. The method of claim 39, wherein said embedding the mesh includes sandwiching at least one core between the mesh.

41. The method of claim 33, wherein said curing includes curing the concrete in carbon dioxide.

42. The method of claim 33, wherein said curing includes curing the concrete in steam.

43. The method of claim 33, wherein said curing includes curing the concrete with an autoclave.

44. The method of claim 33, further comprising:
embedding rebar in the concrete.

45. The method of claim 33, wherein said curing occurs after said attaching.

46. The method of claim 33, further comprising:
creating the concrete by mixing reinforcement fibers and microspheres into cement.

47. The method of claim 46, wherein the reinforcement fibers are polyvinylalcohol (PVA) fibers.

48. The article of claim 1, wherein the reinforcement fibers are polymer fibers.

49. The article of claim 48, wherein the polymer fibers are polyvinylalcohol (PVA) fibers.

* * * * *